(12) United States Patent
Berghegger

(10) Patent No.: US 9,246,391 B2
(45) Date of Patent: Jan. 26, 2016

(54) CONTROLLER FOR PROVIDING A CORRECTED SIGNAL TO A SENSED PEAK CURRENT THROUGH A CIRCUIT ELEMENT OF A POWER CONVERTER

(75) Inventor: Ralf Schroeder genannt Berghegger, Glandorf (DE)

(73) Assignee: Power Systems Technologies Ltd., Ebene (MU)

( * ) Notice: Subject to any disclaimer, the term of this patent is extended or adjusted under 35 U.S.C. 154(b) by 154 days.

(21) Appl. No.: 13/206,659

(22) Filed: Aug. 10, 2011

(65) Prior Publication Data

US 2012/0039098 A1    Feb. 16, 2012

Related U.S. Application Data

(63) Continuation-in-part of application No. 12/692,299, filed on Jan. 22, 2010, now Pat. No. 8,787,043.

(51) Int. Cl.
*H02M 3/335* (2006.01)
*H02M 1/00* (2007.01)

(52) U.S. Cl.
CPC .. *H02M 3/33507* (2013.01); *H02M 2001/0009* (2013.01); *Y02B 70/1433* (2013.01)

(58) Field of Classification Search
USPC ................................ 363/21.12, 21.13, 21.17
See application file for complete search history.

(56) References Cited

U.S. PATENT DOCUMENTS

| | | |
|---|---|---|
| 1,376,978 A | 5/1921 | Stoekle |
| 2,387,943 A | 10/1945 | Putman |
| 2,473,662 A | 6/1949 | Pohm |
| 3,007,060 A | 10/1961 | Guenther |
| 3,346,798 A | 10/1967 | Dinger |
| 3,358,210 A | 12/1967 | Grossoehme |
| 3,433,998 A | 3/1969 | Woelber |
| 3,484,562 A | 12/1969 | Kronfeld |
| 3,553,620 A | 1/1971 | Cielo et al. |
| 3,602,795 A | 8/1971 | Gunn |
| 3,622,868 A | 11/1971 | Todt |
| 3,681,679 A | 8/1972 | Chung |
| 3,708,742 A | 1/1973 | Gunn |

(Continued)

FOREIGN PATENT DOCUMENTS

| | | |
|---|---|---|
| CN | 2904469 Y | 5/2007 |
| CN | 101106850 A | 1/2008 |

(Continued)

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

(Continued)

*Primary Examiner* — Emily P Pham
(74) *Attorney, Agent, or Firm* — Boisbrun Hofman, PLLC

(57) ABSTRACT

A controller for a power converter and method of operating the same. In one embodiment, the controller includes a peak detector, coupled to a circuit element of the power converter, configured to produce a signal corresponding to a peak current through a circuit element. The controller also includes an adjustable reference circuit responsive to a difference between the signal and a reference signal corresponding to a desired peak current to produce a corrected signal corresponding to the peak current.

20 Claims, 10 Drawing Sheets

(56) References Cited

U.S. PATENT DOCUMENTS

| | | | |
|---|---|---|---|
| 3,708,744 A | 1/1973 | Stephens et al. | |
| 4,011,498 A | 3/1977 | Hamsra | |
| 4,019,122 A | 4/1977 | Ryan | |
| 4,075,547 A | 2/1978 | Wroblewski | |
| 4,202,031 A | 5/1980 | Hesler et al. | |
| 4,257,087 A | 3/1981 | Cuk | |
| 4,274,071 A | 6/1981 | Pfarre | |
| 4,327,348 A | 4/1982 | Hirayama | |
| 4,471,423 A | 9/1984 | Hase | |
| 4,499,481 A | 2/1985 | Greene | |
| 4,570,174 A | 2/1986 | Huang et al. | |
| 4,577,268 A | 3/1986 | Easter et al. | |
| 4,581,691 A | 4/1986 | Hock | |
| 4,613,841 A | 9/1986 | Roberts | |
| 4,636,823 A | 1/1987 | Margalit et al. | |
| 4,660,136 A | 4/1987 | Montorefano | |
| 4,672,245 A | 6/1987 | Majumdar et al. | |
| 4,770,667 A | 9/1988 | Evans et al. | |
| 4,770,668 A | 9/1988 | Skoultchi et al. | |
| 4,780,653 A * | 10/1988 | Bezos et al. | 388/822 |
| 4,785,387 A | 11/1988 | Lee et al. | |
| 4,799,138 A | 1/1989 | Chahabadi et al. | |
| 4,803,609 A | 2/1989 | Gillett et al. | |
| 4,823,249 A | 4/1989 | Garcia, II | |
| 4,837,496 A | 6/1989 | Erdi | |
| 4,866,367 A | 9/1989 | Ridley et al. | |
| 4,876,638 A | 10/1989 | Silva et al. | |
| 4,887,061 A | 12/1989 | Matsumura | |
| 4,899,271 A | 2/1990 | Seiersen | |
| 4,903,089 A | 2/1990 | Hollis et al. | |
| 4,922,400 A | 5/1990 | Cook | |
| 4,962,354 A | 10/1990 | Visser et al. | |
| 4,964,028 A | 10/1990 | Spataro | |
| 4,999,759 A | 3/1991 | Cavagnolo et al. | |
| 5,003,277 A | 3/1991 | Sokai et al. | |
| 5,014,178 A | 5/1991 | Balakrishnan | |
| 5,027,264 A | 6/1991 | DeDoncker et al. | |
| 5,055,991 A | 10/1991 | Carroll | |
| 5,068,756 A | 11/1991 | Morris et al. | |
| 5,106,778 A | 4/1992 | Hollis et al. | |
| 5,126,714 A | 6/1992 | Johnson | |
| 5,132,888 A | 7/1992 | Lo et al. | |
| 5,134,771 A | 8/1992 | Lee et al. | |
| 5,172,309 A | 12/1992 | DeDoncker et al. | |
| 5,177,460 A | 1/1993 | Dhyanchand et al. | |
| 5,182,535 A | 1/1993 | Dhyanchand | |
| 5,206,621 A | 4/1993 | Yerman | |
| 5,208,739 A | 5/1993 | Sturgeon | |
| 5,223,449 A | 6/1993 | Morris et al. | |
| 5,225,971 A | 7/1993 | Spreen | |
| 5,231,037 A | 7/1993 | Yuan et al. | |
| 5,244,829 A | 9/1993 | Kim | |
| 5,262,930 A | 11/1993 | Hua et al. | |
| 5,282,126 A | 1/1994 | Husgen | |
| 5,285,396 A | 2/1994 | Aoyama | |
| 5,291,382 A | 3/1994 | Cohen | |
| 5,303,138 A | 4/1994 | Rozman | |
| 5,305,191 A | 4/1994 | Loftus, Jr. | |
| 5,335,163 A | 8/1994 | Seiersen | |
| 5,336,985 A | 8/1994 | McKenzie | |
| 5,342,795 A | 8/1994 | Yuan et al. | |
| 5,343,140 A | 8/1994 | Gegner | |
| 5,353,001 A | 10/1994 | Meinel et al. | |
| 5,369,042 A | 11/1994 | Morris et al. | |
| 5,374,887 A | 12/1994 | Drobnik | |
| 5,399,968 A | 3/1995 | Sheppard et al. | |
| 5,404,082 A | 4/1995 | Hernandez et al. | |
| 5,407,842 A | 4/1995 | Morris et al. | |
| 5,453,923 A | 9/1995 | Scalais et al. | |
| 5,459,652 A | 10/1995 | Faulk | |
| 5,468,661 A | 11/1995 | Yuan et al. | |
| 5,477,175 A | 12/1995 | Tisinger et al. | |
| 5,508,903 A | 4/1996 | Alexndrov | |
| 5,523,673 A | 6/1996 | Ratliff et al. | |
| 5,539,630 A | 7/1996 | Pietkiewicz et al. | |
| 5,554,561 A | 9/1996 | Plumton | |
| 5,555,494 A | 9/1996 | Morris | |
| 5,581,224 A | 12/1996 | Yamaguchi | |
| 5,610,085 A | 3/1997 | Yuan et al. | |
| 5,624,860 A | 4/1997 | Plumton et al. | |
| 5,636,116 A | 6/1997 | Milavec et al. | |
| 5,661,642 A | 8/1997 | Shimashita | |
| 5,663,876 A | 9/1997 | Newton et al. | |
| 5,671,131 A | 9/1997 | Brown | |
| 5,700,703 A | 12/1997 | Huang et al. | |
| 5,712,189 A | 1/1998 | Plumton et al. | |
| 5,719,544 A | 2/1998 | Vinciarelli et al. | |
| 5,734,564 A | 3/1998 | Brkovic | |
| 5,736,842 A | 4/1998 | Jovanovic | |
| 5,742,491 A | 4/1998 | Bowman et al. | |
| 5,747,842 A | 5/1998 | Plumton | |
| 5,756,375 A | 5/1998 | Celii et al. | |
| 5,760,671 A | 6/1998 | Lahr et al. | |
| 5,783,984 A | 7/1998 | Keuneke | |
| 5,784,266 A | 7/1998 | Chen | |
| 5,804,943 A | 9/1998 | Kollman et al. | |
| 5,815,386 A | 9/1998 | Gordon | |
| 5,864,110 A | 1/1999 | Moriguchi et al. | |
| 5,870,296 A | 2/1999 | Schaffer | |
| 5,870,299 A | 2/1999 | Rozman | |
| 5,880,942 A | 3/1999 | Leu | |
| 5,886,508 A | 3/1999 | Jutras | |
| 5,889,298 A | 3/1999 | Plumton et al. | |
| 5,889,660 A | 3/1999 | Taranowski et al. | |
| 5,900,822 A | 5/1999 | Sand et al. | |
| 5,907,481 A | 5/1999 | Svardsjo | |
| 5,909,110 A | 6/1999 | Yuan et al. | |
| 5,910,665 A | 6/1999 | Plumton et al. | |
| 5,920,475 A | 7/1999 | Boylan et al. | |
| 5,925,088 A | 7/1999 | Nasu | |
| 5,929,665 A | 7/1999 | Ichikawa et al. | |
| 5,933,338 A | 8/1999 | Wallace | |
| 5,940,287 A | 8/1999 | Brkovic | |
| 5,946,207 A | 8/1999 | Schoofs | |
| 5,956,245 A | 9/1999 | Rozman | |
| 5,956,578 A | 9/1999 | Weitzel et al. | |
| 5,959,850 A | 9/1999 | Lim | |
| 5,977,853 A | 11/1999 | Ooi et al. | |
| 5,982,640 A | 11/1999 | Naveed | |
| 5,999,066 A | 12/1999 | Saito et al. | |
| 5,999,429 A | 12/1999 | Brown | |
| 6,003,139 A | 12/1999 | McKenzie | |
| 6,008,519 A | 12/1999 | Yuan et al. | |
| 6,011,703 A | 1/2000 | Boylan et al. | |
| 6,034,489 A | 3/2000 | Weng | |
| 6,038,154 A | 3/2000 | Boylan et al. | |
| 6,046,664 A | 4/2000 | Weller et al. | |
| 6,055,166 A | 4/2000 | Jacobs | |
| 6,060,943 A | 5/2000 | Jansen | |
| 6,067,237 A | 5/2000 | Nguyen | |
| 6,069,798 A | 5/2000 | Liu | |
| 6,069,799 A | 5/2000 | Bowman et al. | |
| 6,078,510 A | 6/2000 | Spampinato et al. | |
| 6,084,792 A | 7/2000 | Chen et al. | |
| 6,094,038 A | 7/2000 | Lethellier | |
| 6,097,046 A | 8/2000 | Plumton | |
| 6,125,046 A | 9/2000 | Jang et al. | |
| 6,144,187 A | 11/2000 | Bryson | |
| 6,147,886 A | 11/2000 | Wittenbreder | |
| 6,156,611 A | 12/2000 | Lan et al. | |
| 6,160,374 A | 12/2000 | Hayes et al. | |
| 6,160,721 A | 12/2000 | Kossives et al. | |
| 6,163,466 A | 12/2000 | Davila, Jr. et al. | |
| 6,181,231 B1 | 1/2001 | Bartilson | |
| 6,188,586 B1 | 2/2001 | Farrington et al. | |
| 6,191,964 B1 | 2/2001 | Boylan et al. | |
| 6,204,646 B1 * | 3/2001 | Hiramatsu et al. | 323/273 |
| 6,208,535 B1 | 3/2001 | Parks | |
| 6,212,084 B1 | 4/2001 | Turner | |
| 6,215,290 B1 | 4/2001 | Yang et al. | |
| 6,218,891 B1 | 4/2001 | Lotfi et al. | |
| 6,229,197 B1 | 5/2001 | Plumton et al. | |
| 6,262,564 B1 | 7/2001 | Kanamori | |
| 6,288,501 B1 | 9/2001 | Nakamura et al. | |

(56) References Cited

U.S. PATENT DOCUMENTS

| | | | |
|---|---|---|---|
| 6,288,920 B1 | 9/2001 | Jacobs et al. | |
| 6,295,217 B1 | 9/2001 | Yang et al. | |
| 6,304,460 B1 | 10/2001 | Cuk | |
| 6,309,918 B1 | 10/2001 | Huang et al. | |
| 6,317,021 B1 | 11/2001 | Jansen | |
| 6,317,337 B1 | 11/2001 | Yasumura | |
| 6,320,490 B1 | 11/2001 | Clayton | |
| 6,323,090 B1 | 11/2001 | Zommer | |
| 6,325,035 B1 | 12/2001 | Codina et al. | |
| 6,344,986 B1 | 2/2002 | Jain et al. | |
| 6,345,364 B1 | 2/2002 | Lee | |
| 6,348,848 B1 | 2/2002 | Herbert | |
| 6,351,396 B1 | 2/2002 | Jacobs | |
| 6,356,462 B1 | 3/2002 | Jang et al. | |
| 6,362,986 B1 | 3/2002 | Schultz et al. | |
| 6,373,727 B1 | 4/2002 | Hedenskog et al. | |
| 6,373,734 B1 | 4/2002 | Martinelli | |
| 6,380,836 B2 | 4/2002 | Matsumoto et al. | |
| 6,385,059 B1 * | 5/2002 | Telefus | H02M 3/33507 363/21.07 |
| 6,388,898 B1 | 5/2002 | Fan et al. | |
| 6,392,902 B1 | 5/2002 | Jang et al. | |
| 6,396,718 B1 | 5/2002 | Ng et al. | |
| 6,400,579 B2 | 6/2002 | Cuk | |
| 6,414,578 B1 | 7/2002 | Jitaru | |
| 6,418,039 B2 * | 7/2002 | Lentini et al. | 363/21.06 |
| 6,438,009 B2 | 8/2002 | Assow | |
| 6,445,598 B1 | 9/2002 | Yamada | |
| 6,462,965 B1 | 10/2002 | Uesono | |
| 6,466,461 B2 | 10/2002 | Mao et al. | |
| 6,469,564 B1 | 10/2002 | Jansen | |
| 6,477,065 B2 | 11/2002 | Parks | |
| 6,483,724 B1 | 11/2002 | Blair et al. | |
| 6,489,754 B2 | 12/2002 | Blom | |
| 6,498,367 B1 | 12/2002 | Chang et al. | |
| 6,501,193 B1 | 12/2002 | Krugly | |
| 6,504,321 B2 | 1/2003 | Giannopoulos et al. | |
| 6,512,352 B2 | 1/2003 | Qian | |
| 6,525,603 B1 | 2/2003 | Morgan | |
| 6,539,299 B2 | 3/2003 | Chatfield et al. | |
| 6,545,453 B2 | 4/2003 | Glinkowski et al. | |
| 6,548,992 B1 | 4/2003 | Alcantar et al. | |
| 6,549,436 B1 | 4/2003 | Sun | |
| 6,552,917 B1 | 4/2003 | Bourdillon | |
| 6,559,689 B1 | 5/2003 | Clark | |
| 6,563,725 B2 | 5/2003 | Carsten | |
| 6,570,268 B1 | 5/2003 | Perry et al. | |
| 6,580,627 B2 | 6/2003 | Toshino | |
| 6,597,588 B2 | 7/2003 | Matsumoto | |
| 6,597,592 B2 | 7/2003 | Carsten | |
| 6,608,768 B2 | 8/2003 | Sula | |
| 6,611,132 B2 | 8/2003 | Nakagawa et al. | |
| 6,614,206 B1 | 9/2003 | Wong et al. | |
| 6,636,025 B1 | 10/2003 | Irissou | |
| 6,654,259 B2 | 11/2003 | Koshita et al. | |
| 6,661,276 B1 | 12/2003 | Chang | |
| 6,668,296 B1 | 12/2003 | Dougherty et al. | |
| 6,674,658 B2 | 1/2004 | Mao et al. | |
| 6,683,797 B2 | 1/2004 | Zaitsu et al. | |
| 6,687,137 B1 | 2/2004 | Yasumura | |
| 6,696,910 B2 | 2/2004 | Nuytkens et al. | |
| 6,731,486 B2 | 5/2004 | Holt et al. | |
| 6,741,099 B1 | 5/2004 | Krugly | |
| 6,751,106 B2 | 6/2004 | Zhang et al. | |
| 6,753,723 B2 | 6/2004 | Zhang | |
| 6,765,810 B2 | 7/2004 | Perry | |
| 6,775,159 B2 | 8/2004 | Webb et al. | |
| 6,784,644 B2 | 8/2004 | Xu et al. | |
| 6,804,125 B2 | 10/2004 | Brkovic | |
| 6,813,170 B2 | 11/2004 | Yang | |
| 6,831,847 B2 | 12/2004 | Perry | |
| 6,856,149 B2 | 2/2005 | Yang | |
| 6,862,194 B2 | 3/2005 | Yang et al. | |
| 6,867,678 B2 | 3/2005 | Yang | |
| 6,867,986 B2 | 3/2005 | Amei | |
| 6,873,237 B2 | 3/2005 | Chandrasekaran et al. | |
| 6,882,548 B1 | 4/2005 | Jacobs | |
| 6,906,934 B2 | 6/2005 | Yang et al. | |
| 6,943,553 B2 | 9/2005 | Zimmerman | |
| 6,944,033 B1 | 9/2005 | Xu et al. | |
| 6,977,824 B1 | 12/2005 | Yang et al. | |
| 6,980,077 B1 | 12/2005 | Chandrasekaran et al. | |
| 6,982,887 B2 | 1/2006 | Batarseh et al. | |
| 7,009,486 B1 | 3/2006 | Goeke et al. | |
| 7,012,414 B1 | 3/2006 | Mehrotra et al. | |
| 7,016,204 B2 | 3/2006 | Yang et al. | |
| 7,023,679 B2 | 4/2006 | Tomiyama | |
| 7,026,807 B2 | 4/2006 | Anderson et al. | |
| 7,034,586 B2 | 4/2006 | Mehas et al. | |
| 7,034,647 B2 | 4/2006 | Yan et al. | |
| 7,046,523 B2 | 5/2006 | Sun et al. | |
| 7,061,358 B1 | 6/2006 | Yang | |
| 7,072,189 B2 | 7/2006 | Kim | |
| 7,075,799 B2 | 7/2006 | Qu | |
| 7,076,360 B1 | 7/2006 | Ma | |
| 7,095,638 B2 | 8/2006 | Uusitalo | |
| 7,098,640 B2 | 8/2006 | Brown | |
| 7,099,163 B1 | 8/2006 | Ying | |
| 7,136,293 B2 | 11/2006 | Petkov et al. | |
| 7,148,669 B2 | 12/2006 | Maksimovic et al. | |
| 7,170,268 B2 | 1/2007 | Kim | |
| 7,176,662 B2 | 2/2007 | Chandrasekaran | |
| 7,209,024 B2 | 4/2007 | Nakahori | |
| 7,269,038 B2 | 9/2007 | Shekhawat et al. | |
| 7,280,026 B2 | 10/2007 | Chandrasekaran et al. | |
| 7,285,807 B2 | 10/2007 | Brar et al. | |
| 7,298,118 B2 | 11/2007 | Chandrasekaran | |
| 7,301,785 B2 | 11/2007 | Yasumura | |
| 7,312,686 B2 | 12/2007 | Bruno | |
| 7,321,283 B2 | 1/2008 | Mehrotra et al. | |
| 7,332,992 B2 | 2/2008 | Iwai | |
| 7,339,208 B2 | 3/2008 | Brar et al. | |
| 7,339,801 B2 | 3/2008 | Yasumura | |
| 7,348,612 B2 | 3/2008 | Sriram et al. | |
| 7,360,004 B2 | 4/2008 | Dougherty et al. | |
| 7,362,592 B2 | 4/2008 | Yang et al. | |
| 7,362,593 B2 | 4/2008 | Yang et al. | |
| 7,375,607 B2 | 5/2008 | Lee et al. | |
| 7,375,994 B2 | 5/2008 | Andreycak | |
| 7,385,375 B2 | 6/2008 | Rozman | |
| 7,386,404 B2 | 6/2008 | Cargonja et al. | |
| 7,393,247 B1 | 7/2008 | Yu et al. | |
| 7,417,875 B2 | 8/2008 | Chandrasekaran et al. | |
| 7,427,910 B2 | 9/2008 | Mehrotra et al. | |
| 7,431,862 B2 | 10/2008 | Mehrotra et al. | |
| 7,439,556 B2 | 10/2008 | Brar et al. | |
| 7,439,557 B2 | 10/2008 | Brar et al. | |
| 7,446,512 B2 | 11/2008 | Nishihara et al. | |
| 7,447,049 B2 | 11/2008 | Garner et al. | |
| 7,453,709 B2 | 11/2008 | Park et al. | |
| 7,462,891 B2 | 12/2008 | Brar et al. | |
| 7,468,649 B2 | 12/2008 | Chandrasekaran | |
| 7,471,527 B2 | 12/2008 | Chen | |
| 7,489,225 B2 | 2/2009 | Dadafshar | |
| 7,541,640 B2 | 6/2009 | Brar et al. | |
| 7,554,430 B2 | 6/2009 | Mehrotra et al. | |
| 7,558,037 B1 | 7/2009 | Gong et al. | |
| 7,558,082 B2 | 7/2009 | Jitaru | |
| 7,567,445 B2 | 7/2009 | Coulson et al. | |
| 7,583,555 B2 | 9/2009 | Kang et al. | |
| 7,626,370 B1 | 12/2009 | Mei et al. | |
| 7,630,219 B2 | 12/2009 | Lee | |
| 7,633,369 B2 | 12/2009 | Chandrasekaran et al. | |
| 7,646,616 B2 | 1/2010 | Wekhande | |
| 7,663,183 B2 | 2/2010 | Brar et al. | |
| 7,667,986 B2 | 2/2010 | Artusi et al. | |
| 7,675,758 B2 | 3/2010 | Artusi et al. | |
| 7,675,759 B2 | 3/2010 | Artusi et al. | |
| 7,675,764 B2 | 3/2010 | Chandrasekaran et al. | |
| 7,715,217 B2 | 5/2010 | Manabe et al. | |
| 7,733,679 B2 | 6/2010 | Luger et al. | |
| 7,746,041 B2 | 6/2010 | Xu et al. | |
| 7,778,050 B2 | 8/2010 | Yamashita | |
| 7,778,051 B2 | 8/2010 | Yang | |

(56) References Cited

U.S. PATENT DOCUMENTS

| | | |
|---|---|---|
| 7,787,264 B2 | 8/2010 | Yang |
| 7,791,903 B2 | 9/2010 | Zhang |
| 7,795,849 B2 | 9/2010 | Sohma |
| 7,813,101 B2 | 10/2010 | Morikawa |
| 7,847,535 B2 | 12/2010 | Meynard et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,134,443 B2 | 3/2012 | Chandrasekaran et al. |
| 8,179,699 B2 | 5/2012 | Tumminaro et al. |
| 8,184,456 B1 | 5/2012 | Jain et al. |
| 8,363,439 B2 | 1/2013 | Yang |
| 8,415,737 B2 | 4/2013 | Brar et al. |
| 8,467,199 B2 | 6/2013 | Lee et al. |
| 8,488,355 B2 | 7/2013 | Berghegger |
| 8,502,461 B2 | 8/2013 | Shiu et al. |
| 8,520,414 B2 | 8/2013 | Garrity et al. |
| 8,520,420 B2 | 8/2013 | Jungreis et al. |
| 8,638,578 B2 | 1/2014 | Zhang |
| 8,643,222 B2 | 2/2014 | Brinlee et al. |
| 8,664,893 B2 | 3/2014 | Lee et al. |
| 8,749,174 B2 | 6/2014 | Angeles |
| 8,767,418 B2 | 7/2014 | Jungreis et al. |
| 8,787,043 B2 | 7/2014 | Berghegger |
| 8,792,256 B2 | 7/2014 | Berghegger |
| 8,792,257 B2 | 7/2014 | Berghegger |
| 8,976,549 B2 | 3/2015 | genannt Berghegger |
| 9,077,248 B2 | 7/2015 | Brinlee |
| 9,088,216 B2 | 7/2015 | Garrity et al. |
| 2001/0020886 A1 | 9/2001 | Matsumoto et al. |
| 2001/0024373 A1 | 9/2001 | Cuk |
| 2001/0055216 A1 | 12/2001 | Shirato |
| 2002/0044463 A1 | 4/2002 | Bontempo et al. |
| 2002/0071295 A1 | 6/2002 | Nishikawa |
| 2002/0101741 A1 | 8/2002 | Brkovic |
| 2002/0110005 A1 | 8/2002 | Mao et al. |
| 2002/0114172 A1 | 8/2002 | Webb et al. |
| 2002/0167385 A1 | 11/2002 | Ackermann |
| 2002/0176262 A1 | 11/2002 | Tripathi et al. |
| 2003/0026115 A1 | 2/2003 | Miyazaki |
| 2003/0030422 A1 | 2/2003 | Sula |
| 2003/0039129 A1 | 2/2003 | Miyazaki et al. |
| 2003/0063483 A1 | 4/2003 | Carsten |
| 2003/0063484 A1 | 4/2003 | Carsten |
| 2003/0076079 A1 | 4/2003 | Alcantar et al. |
| 2003/0086279 A1 | 5/2003 | Bourdillon |
| 2003/0197585 A1 | 10/2003 | Chandrasekaran et al. |
| 2003/0198067 A1 | 10/2003 | Sun et al. |
| 2004/0032754 A1 | 2/2004 | Yang |
| 2004/0034555 A1 | 2/2004 | Dismukes et al. |
| 2004/0064621 A1 | 4/2004 | Dougherty et al. |
| 2004/0148047 A1 | 7/2004 | Dismukes et al. |
| 2004/0156220 A1 | 8/2004 | Kim et al. |
| 2004/0174147 A1 | 9/2004 | Vinciarelli |
| 2004/0196672 A1 | 10/2004 | Amei |
| 2004/0200631 A1 | 10/2004 | Chen |
| 2004/0201380 A1 | 10/2004 | Zimmermann et al. |
| 2004/0217794 A1 | 11/2004 | Strysko |
| 2004/0257095 A1 | 12/2004 | Yang |
| 2005/0024179 A1 | 2/2005 | Chandrasekaran et al. |
| 2005/0046404 A1 | 3/2005 | Uusitalo |
| 2005/0052224 A1 | 3/2005 | Yang et al. |
| 2005/0052886 A1 | 3/2005 | Yang et al. |
| 2005/0207189 A1 | 9/2005 | Chen |
| 2005/0245658 A1 | 11/2005 | Mehrotra et al. |
| 2005/0254266 A1 | 11/2005 | Jitaru |
| 2005/0254268 A1 | 11/2005 | Reinhard et al. |
| 2005/0281058 A1 | 12/2005 | Batarseh et al. |
| 2005/0286270 A1 | 12/2005 | Petkov et al. |
| 2006/0006975 A1 | 1/2006 | Jitaru et al. |
| 2006/0006976 A1 | 1/2006 | Bruno |
| 2006/0007713 A1 | 1/2006 | Brown |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0044845 A1 | 3/2006 | Fahlenkamp |
| 2006/0091430 A1 | 5/2006 | Sriram et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0227576 A1 | 10/2006 | Yasumura |
| 2006/0237968 A1 | 10/2006 | Chandrasekaran |
| 2006/0255360 A1 | 11/2006 | Brar et al. |
| 2006/0271315 A1 | 11/2006 | Cargonja et al. |
| 2006/0286865 A1 | 12/2006 | Chou et al. |
| 2007/0007945 A1 | 1/2007 | King et al. |
| 2007/0010298 A1 | 1/2007 | Chang |
| 2007/0019356 A1 | 1/2007 | Morikawa |
| 2007/0025124 A1 | 2/2007 | Hansson |
| 2007/0030717 A1 | 2/2007 | Luger et al. |
| 2007/0041224 A1* | 2/2007 | Moyse et al. .............. 363/21.01 |
| 2007/0045765 A1 | 3/2007 | Brar et al. |
| 2007/0058402 A1 | 3/2007 | Shekhawat et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0139984 A1 | 6/2007 | Lo |
| 2007/0159857 A1 | 7/2007 | Lee |
| 2007/0206523 A1* | 9/2007 | Huynh et al. ................. 370/318 |
| 2007/0222463 A1 | 9/2007 | Qahouq et al. |
| 2007/0241721 A1 | 10/2007 | Weinstein et al. |
| 2007/0257650 A1 | 11/2007 | Southwell |
| 2007/0274106 A1 | 11/2007 | Coulson et al. |
| 2007/0274107 A1 | 11/2007 | Garner et al. |
| 2007/0296028 A1 | 12/2007 | Brar et al. |
| 2007/0296383 A1 | 12/2007 | Xu |
| 2007/0298559 A1 | 12/2007 | Brar et al. |
| 2007/0298564 A1 | 12/2007 | Brar et al. |
| 2008/0012423 A1 | 1/2008 | Mimran |
| 2008/0012802 A1 | 1/2008 | Lin |
| 2008/0024094 A1 | 1/2008 | Nishihara et al. |
| 2008/0024259 A1 | 1/2008 | Chandrasekaran et al. |
| 2008/0030178 A1 | 2/2008 | Leonard et al. |
| 2008/0031021 A1* | 2/2008 | Ros et al. ...................... 363/46 |
| 2008/0037294 A1 | 2/2008 | Indika de Silva et al. |
| 2008/0043503 A1 | 2/2008 | Yang |
| 2008/0054874 A1 | 3/2008 | Chandrasekaran et al. |
| 2008/0061746 A1* | 3/2008 | Kobayashi et al. ........... 320/166 |
| 2008/0080219 A1 | 4/2008 | Sohma |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0198638 A1 | 8/2008 | Reinberger et al. |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0278092 A1 | 11/2008 | Lys |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0002054 A1 | 1/2009 | Tsunoda et al. |
| 2009/0037768 A1 | 2/2009 | Adams |
| 2009/0046486 A1 | 2/2009 | Lu et al. |
| 2009/0072626 A1 | 3/2009 | Watanabe et al. |
| 2009/0091957 A1 | 4/2009 | Orr |
| 2009/0097290 A1 | 4/2009 | Chandrasekaran |
| 2009/0237960 A1* | 9/2009 | Coulson et al. ............ 363/21.12 |
| 2009/0257250 A1 | 10/2009 | Liu |
| 2009/0273957 A1 | 11/2009 | Feldtkeller |
| 2009/0284994 A1 | 11/2009 | Lin et al. |
| 2009/0289557 A1 | 11/2009 | Itoh et al. |
| 2009/0290385 A1 | 11/2009 | Jungreis et al. |
| 2009/0310388 A1 | 12/2009 | Yang |
| 2009/0315530 A1 | 12/2009 | Baranwal |

(56) References Cited

U.S. PATENT DOCUMENTS

| | | |
|---|---|---|
| 2010/0020578 A1 | 1/2010 | Ryu et al. |
| 2010/0054000 A1 | 3/2010 | Huynh |
| 2010/0066336 A1 | 3/2010 | Araki et al. |
| 2010/0091522 A1 | 4/2010 | Chandrasekaran et al. |
| 2010/0123447 A1 | 5/2010 | Vecera |
| 2010/0123486 A1 | 5/2010 | Berghegger |
| 2010/0149838 A1 | 6/2010 | Artusi et al. |
| 2010/0164400 A1 | 7/2010 | Adragna |
| 2010/0164443 A1 | 7/2010 | Tumminaro et al. |
| 2010/0182806 A1 | 7/2010 | Garrity et al. |
| 2010/0188876 A1 | 7/2010 | Garrity et al. |
| 2010/0202165 A1 | 8/2010 | Zheng et al. |
| 2010/0213989 A1 | 8/2010 | Nakatake |
| 2010/0219802 A1 | 9/2010 | Lin et al. |
| 2010/0254168 A1 | 10/2010 | Chandrasekaran |
| 2010/0321958 A1* | 12/2010 | Brinlee et al. ............... 363/21.1 |
| 2010/0321964 A1 | 12/2010 | Brinlee et al. |
| 2011/0025289 A1 | 2/2011 | Wang et al. |
| 2011/0038179 A1 | 2/2011 | Zhang |
| 2011/0062926 A1 | 3/2011 | Qiu et al. |
| 2011/0080102 A1 | 4/2011 | Ge et al. |
| 2011/0089917 A1* | 4/2011 | Chen et al. .................. 323/282 |
| 2011/0095730 A1 | 4/2011 | Strijker et al. |
| 2011/0134664 A1 | 6/2011 | Berghegger |
| 2011/0149607 A1 | 6/2011 | Jungreis et al. |
| 2011/0157936 A1 | 6/2011 | Huynh |
| 2011/0182089 A1 | 7/2011 | Berghegger |
| 2011/0239008 A1 | 9/2011 | Lam et al. |
| 2011/0241738 A1 | 10/2011 | Tamaoka |
| 2011/0267856 A1 | 11/2011 | Pansier |
| 2011/0291591 A1 | 12/2011 | Shiu et al. |
| 2011/0305047 A1 | 12/2011 | Jungreis et al. |
| 2012/0020119 A1 | 1/2012 | Tang et al. |
| 2012/0243271 A1 | 9/2012 | Berghegger |
| 2012/0250378 A1 | 10/2012 | Kok et al. |
| 2012/0294048 A1 | 11/2012 | Brinlee |
| 2013/0003430 A1 | 1/2013 | Reddy |
| 2013/0134894 A1 | 5/2013 | Kuang |
| 2013/0229829 A1 | 9/2013 | Zhang et al. |
| 2013/0250627 A1 | 9/2013 | Herfurth |
| 2014/0091718 A1 | 4/2014 | Brinlee |
| 2014/0091720 A1 | 4/2014 | Brinlee |
| 2014/0254215 A1 | 9/2014 | Brinlee et al. |
| 2014/0301111 A1 | 10/2014 | Jungreis et al. |
| 2015/0098254 A1 | 4/2015 | Brinlee et al. |
| 2015/0138857 A1 | 5/2015 | Ye et al. |

FOREIGN PATENT DOCUMENTS

| | | |
|---|---|---|
| CN | 101123395 A | 2/2008 |
| CN | 101141099 | 3/2008 |
| CN | 101202509 | 6/2008 |
| CN | 201252294 | 6/2009 |
| CN | 101834541 A | 9/2010 |
| CN | 102412727 A | 4/2012 |
| CN | 102695325 A | 9/2012 |
| CN | 101489335 B | 12/2012 |
| DE | 851241 | 10/1960 |
| DE | 10112820 A1 | 10/2002 |
| DE | 10310361 | 9/2004 |
| DE | 10352509 A1 | 6/2005 |
| DE | 102013104899 A1 | 11/2014 |
| EP | 0665634 | 8/1995 |
| JP | 57097361 | 6/1982 |
| JP | 3-215911 | 9/1991 |
| JP | 2000-68132 | 3/2000 |
| JP | 2008283818 A | 11/2008 |
| WO | 8700991 | 2/1987 |
| WO | 03088463 A1 | 10/2003 |
| WO | 2010083511 | 7/2010 |
| WO | 2010083514 | 7/2010 |
| WO | 2010114914 | 10/2010 |
| WO | 2011116225 | 9/2011 |

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Balogh, L. et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W. et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

Chen, W. et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

Chhawchharia, P., et al., "On the Reduction of Component Count in Switched Capacitor DC/DC Convertors," Hong Kong Polytechnic University, IEEE, 1997, Hung Horn, Kowloon, Hong King, pp. 1395-1401.

Curtis, K., "Advances in Microcontroller Peripherals Facilitate Current-Mode for Digital Power Supplies," Digital Power Forum '06, 4 pp., Sep. 2006, Darnell Group, Richardson, TX.

Eisenbeiser, K., et al., "Manufacturable GaAs VFET for Power Switching Applications," IEEE Electron Device Letters, Apr. 2000, pp. 144-145, vol. 21, No. 4, IEEE.

Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.

Jitaru, I.D. et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.

Kollman, R., et al., "10 MHz Pwm Converters with GaAs VFETs," IEEE 11th Annual Applied Power Electronics Conference and Exposition, Mar. 1996, pp. 264-269, vol. 1, IEEE.

Kuwabara, K., et al., "Switched-Capacitor DC-DC Converters," Fujitsu Limited, IEEE, 1988, Kawasaki, Japan, pp. 213-218.

Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.

Lenk, R., "Introduction to the Tapped Buck Converter," PCIM 2000, HFPC 2000 Proceedings, Oct. 2000, pp. 155-166.

Liu, W., "Fundamentals of III-V Devices: HBTs, MESFETs, and HFETs/HEMTs," §5-5: Modulation Doping, 1999, pp. 323-330, John Wiley & Sons, New York, NY.

Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.

Maxim, Application Note 725, www.maxim-ic.com/an725, Maxim Integrated Products, Nov. 29, 2001, 8 pages.

(56) References Cited

OTHER PUBLICATIONS

Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.
Miwa, B.A., et al., "High Efficiency Power Factor Correction Using Interleaving Techniques," IEEE Proceedings Of APEC, 1992, pp. 557-568, IEEE, Los Alamitos, CA.
National Semiconductor Corporation, "LMC7660 Switched Capacitor Voltage Converter," www.national.com, Apr. 1997, 12 pages.
National Semiconductor Corporation, "LM2665 Switched Capacitor Voltage Converter,"www.national.com, Sep. 2005, 9 pages.
Nguyen, L.D. etal., "Ultra-High-Speed Modulation-Doped Field-Effect Transistors: A Tutorial Review,"Proceedings of the IEEE, Apr. 1992, pp. 494-518, vol. 80, No. 4, IEEE.
Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.
Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.
O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.
Peng, C., et al., "A New Efficient High Frequency Rectifier Circuit," Proceedings of 1991 High Frequency Power Conversion (HFPC '91) Conference, Jun. 1991, pp. 236-243, Toronto, CA.
Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.
Plumton, D.L., et al., "A Low On-Resistance High-Current GaAs Power VFET," IEEE Electron Device Letters, Apr. 1995, pp. 142-144, vol. 16, No. 4, IEEE.
Rajeev, M. "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.
Rico, M., et al., "Static and Dynamic Modeling of Tapped-Inductor DC-to-DC Converters," 1987, pp. 281-288, IEEE, Los Alamitos, CA.
Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.
Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.
Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.
Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.
Texas Instruments Incorporated, "LT1054, LT1054Y Switched-Capacitor Voltage Converters With Regulators," SLVS033C, Feb. 1990—Revised Jul. 1998, 25 pages.
Thaker, M., et al., "Adaptive/Intelligent Control and Power Management Reduce Power Dissipation and Consumption," Digital Power Forum '06, 11 pp., Sep. 2006, Darnell Group, Richardson, TX.
Vallamkonda, S., "Limitations of Switching Voltage Regulators," A Thesis in Electrical Engineering, Texas Tech University, May 2004, 89 pages.
Wei, J., et al., "Comparison of Three Topology Candidates for 12V VRM," IEEE APEC, 2001, pp. 245-251, IEEE, Los Alamitos, CA.
Weitzel, C.E., "RF Power Devices for Wireless Communications," 2002 IEEE MTT-S CDROM, 2002, pp. 285-288, paper TU4B-1, IEEE, Los Alamitos, CA.
Williams, R., "Modern GaAs Processing Methods," 1990, pp. 66-67, Artech House, Inc., Norwood, MA.
Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.
Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.
Xu, P., et al., "Design and Performance Evaluation of Multi-Channel Interleaved Quasi-Square-Wave Buck Voltage Regulator Module," HFPC 2000 Proceedings, Oct. 2000, pp. 82-88.
Xu, P., et al., "Design of 48 V Voltage Regulator Modules with a Novel Integrated Magnetics," IEEE Transactions On Power Electronics, Nov. 2002, pp. 990-998, vol. 17, No. 6, IEEE, Los Alamitos, CA.
Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.
Xu, P., et al., "A Novel Integrated Current Doubler Rectifier," IEEE 2000 Applied Power Electronics Conference, Mar. 2000, pp. 735-740, IEEE, Los Alamitos, CA.
Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.
Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.
Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.
Zhou, X., et al., "Investigation of Candidate VRM Topologies for Future Microprocessors," IEEE Applied Power Electronics Conference, Mar. 1998, pp. 145-150, IEEE, Los Alamitos, CA.
Bill Andreycak, Active Clamp and Reset Technique Enhances Forward Converter Performance, Oct' 1994, Texas Instruments, 19 pages.
Ridley, R., Designing with the TL431, Switching Power Magazine, Designer Series XV, pp. 1-5, 2005.

\* cited by examiner

CONTROLLER FOR PROVIDING A CORRECTED SIGNAL TO A SENSED PEAK CURRENT THROUGH A CIRCUIT ELEMENT OF A POWER CONVERTER

This application is a continuation in part of, and claims priority to, U.S. patent application Ser. No. 12/692,299, entitled "Controller for a Power Converter and Method of Operating the Same," filed on Jan. 22, 2010, which is incorporated herein by reference.

TECHNICAL FIELD

The present invention is directed, in general, to power electronics and, more specifically, to a controller for a power converter and method of operating the same.

BACKGROUND

A switched-mode power converter (also referred to as a "power converter" or "regulator") is a power supply or power processing circuit that converts an input voltage waveform into a specified output voltage waveform. DC-DC power converters convert a direct current ("dc") input voltage that may be derived from an alternating current ("ac") source by rectification into a dc output voltage. Controllers associated with the power converters manage an operation thereof by controlling conduction periods of power switches employed therein. Some power converters include a controller coupled between an input and output of the power converter in a feedback loop configuration (also referred to as a "control loop" or "closed control loop") to regulate an output characteristic of the power converter.

Typically, the controller measures the output characteristic (e.g., an output voltage, an output current, or a combination of an output voltage and an output current) of the power converter, and based thereon modifies a duty cycle or an on time (or conduction period) of a power switch of the power converter to regulate the output characteristic. To increase an efficiency of a flyback power converter, a capacitor is coupled across a power switch to limit a voltage of the power switch while a transformer of the power converter is reset when the power switch is turned off. A flyback power train topology may be configured as a quasi-resonant flyback power converter.

In a common application of a flyback power converter, an output current of the power converter is regulated. With conventional design approaches, however, it is difficult to achieve quasi-resonant power converter operation and, at the same time, regulate an output current of the power converter. In one conventional approach, an on time of a diode on a secondary side of the power converter is sensed and a peak value of primary current is held constant, the output current is kept constant by controlling an off time of a power switch on a primary side of the power converter. This process may defeat quasi-resonant switching operation of the power converter.

In another approach, an output current is sensed and a power switch on a primary side of the power converter is controlled employing an optocoupler to transmit a signal of the secondary side of the power converter to a controller referenced to the primary side of the power converter. This approach increases power converter cost due to the presence of the optocoupler. In yet another approach, a regulation of an output current is implemented through the controller by calculating an output current employing an average of input current and a duty cycle of a power switch on a primary side of the power converter. This approach preserves quasi-resonant switching without the need for an optocoupler, but requires a complex calculation in the controller.

In a switched-mode power converter, it is generally beneficial to limit a peak current in a primary winding of a magnetic circuit element (or device) such as a power transformer or an inductor. This prevents magnetic saturation in the magnetic circuit element, to protect a power switch employed therein, or to limit a maximum level of output power from the power converter. If a peak current in a winding of the magnetic circuit element is not limited or otherwise controlled to a constant level, this can have an unwanted effect on output of the power converter (e.g., an output ripple can increase), and a primary-controlled output current limit can exhibit an unwanted level of variation.

It is common practice in the design of a switched-mode power converter to use a comparator to limit a peak current to a desired current limit in a primary winding of the magnetic circuit element. The comparator sends a signal to control logic when a voltage at a shunt resistor or other current-sensing circuit element becomes higher than a reference voltage. Then the control logic switches off a power switch. The comparator, the control logic and the power switch, however, operate with inherent delays that can be variable as a function of the operating environment and sensed voltages. Due to these inherent and variable delays, current in the power switch and the magnetic circuit element continues to rise with the result that the peak of the current becomes higher than the desired current limit by a variable amount that is generally dependent on an input voltage to the power converter. A higher input voltage generally produces a higher current difference between the peak of the current and the desired current limit.

Thus, a peak current limiter that limits a peak current of a power converter that produces a constant level thereof still presents unresolved design challenges. Accordingly, what is needed in the art is a design approach and related method to implement a controller that determines and limits a peak current for a power converter without compromising end-product performance and that can be advantageously adapted to high-volume manufacturing techniques.

SUMMARY OF THE INVENTION

These and other problems are generally solved or circumvented, and technical advantages are generally achieved, by advantageous embodiments of the present invention, including a controller for a power converter and method of operating the same. In one embodiment, the controller includes a peak detector, coupled to a circuit element of the power converter, configured to produce a signal corresponding to a peak current through a circuit element. The controller also includes an adjustable reference circuit responsive to a difference between the signal and a reference signal corresponding to a desired peak current to produce a corrected signal corresponding to the peak current.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different FIGUREs may refer to corresponding parts, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a controller for a power converter (e.g., a flyback power converter) including a peak detector coupled to a circuit element (e.g., a power switch) of the power converter configured to produce a signal corresponding to a peak current through the power switch, and an adjustable reference circuit responsive to a difference between the signal and a reference signal corresponding to a desired peak current to produce a corrected signal corresponding to the peak current. The controller may further comprise a current limiter coupled to the peak detector and the adjustable reference circuit configured to disable conductivity of the power switch when the signal exceeds the corrected signal. While the principles of the present invention will be described in the environment of a power converter, any application that may benefit from a power converter including a motor drive or a power amplifier is well within the broad scope of the present invention.

Figure 1:
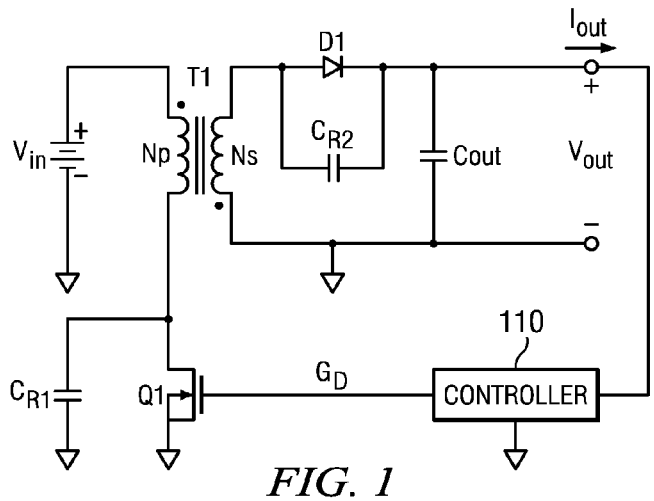
FIG. 1 illustrates a schematic diagram of an embodiment of portions of a power converter that provides an environment for application of the present invention.

Turning now to FIG. 1, illustrated is a schematic diagram of an embodiment of portions of a power converter (e.g., a quasi-resonant flyback power converter) that provides an environment for application of the present invention. A power train of the power converter includes a power switch Q1 coupled to a source of electrical power such as a dc input power source that provides an input voltage $V_{in}$, represented by a battery. The dc input power source supplies input power to an isolating transformer or transformer T1. The transformer T1 has primary winding with primary turns Np and a secondary winding with secondary turns Ns that are selected to provide an output voltage $V_{out}$ with consideration of a resulting duty cycle and stress on power train components. The power switch Q1 (e.g., an n-channel metal-oxide semiconductor field-effect transistor ("MOSFET")) is controlled by a controller (e.g., a pulse-width modulation ("PWM") controller) 110 that periodically controls the power switch Q1 to be conducting for a duty cycle D with a frequency $f_s$.

When the power switch Q1 is switched off, energy stored in magnetizing and leakage inductances of transformer T1 causes a current to continue flowing in the primary winding of the transformer T1 that produces a charge in a primary resonant capacitor $C_{R1}$. A voltage built up across terminals of the primary resonant capacitor $C_{R1}$ contributes to resetting the magnetic flux in the core of transformer T1. The power switch Q1 conducts alternately with the switching frequency $f_s$ in response to a gate-drive signal $G_D$ produced by the PWM controller 110. The duty cycle D is adjusted by the PWM controller 110 to regulate an output characteristic of the power converter such as output voltage $V_{out}$, an output current $I_{out}$, or a combination of the two. Energy stored in the magnetizing inductance of transformer T1 also produces a pulsating forward current in a diode D1 that provides an output current $I_{out}$ of the power converter. The ac voltage appearing on the secondary winding of the transformer T1 is rectified by the diode D1, and the dc component of the resulting waveform is coupled to the output of the power converter through a low-pass output filter formed with an output filter capacitor Cout to produce the output voltage $V_{out}$. A secondary resonant capacitor $C_{R2}$ is also frequently coupled across terminals of the diode D1 in a quasi-resonant flyback power converter to limit a peak inverse voltage produced across terminals of the diode D1 when the power switch Q1 is turned on.

In general, the duty cycle D of the power switch Q1 may be adjusted by the PWM controller 110 to maintain a regulation of the output voltage $V_{out}$ or the output current $I_{out}$ of the power converter. Those skilled in the art should understand that the PWM controller 110 may include an isolation device such as an optocoupler with its attendant cost to provide metallic isolation between the primary and secondary sides of the power converter.

Figure 2:
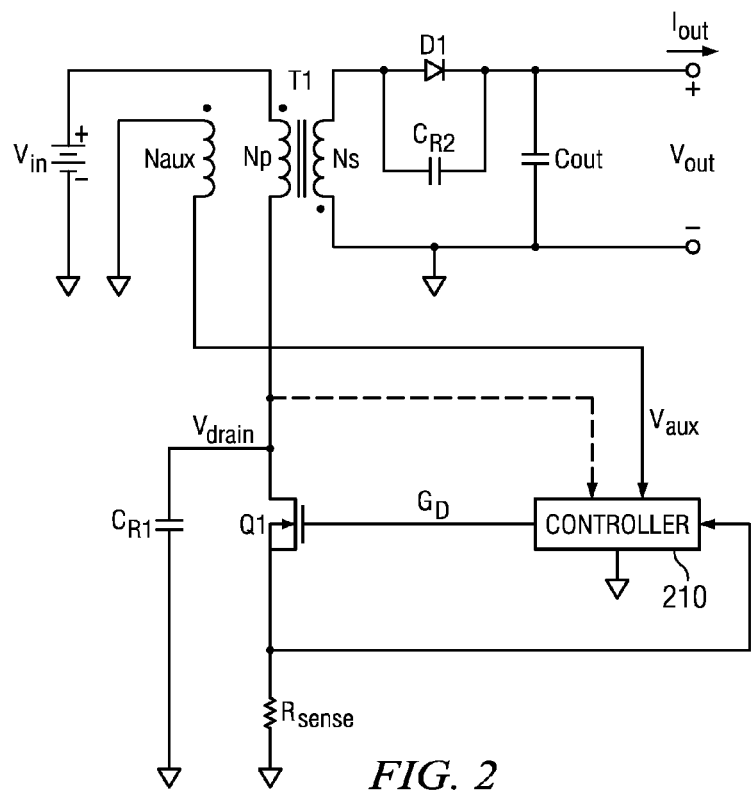
FIG. 2 illustrates a schematic diagram of an embodiment of a power converter including a controller constructed according to the principles of the present invention.

Turning now to FIG. 2, illustrated is a schematic diagram of an embodiment of a power converter (e.g., a quasi-resonant flyback power converter) including a controller (e.g., a PWM controller) 210 constructed according to the principles of the present invention. The PWM controller 210 senses a current in a power switch Q1 employing a sense resistor $R_{sense}$ coupled in series with a source of the power switch Q1, illustrated in FIG. 2 as a MOSFET. In an alternative embodiment, a current in the power switch Q1 may be sensed with a current-sense transformer, employing circuit structures well known in the art. The PWM controller 210 also senses a drain voltage $V_{drain}$ of the power switch Q1. In an alternative embodiment, the PWM controller 210 senses an auxiliary voltage $V_{aux}$ across an auxiliary winding $N_{aux}$ of a transformer T1 in lieu of the drain voltage $V_{drain}$.

The PWM controller 210 regulates an output current $I_{out}$ of the power converter. To calculate the primary peak current Ip through a primary winding of a transformer T1 to control an on time of the power switch Q1, the PWM controller 210 estimates a time interval $t_{sec}$ of current flow in the secondary winding of the transformer T1 through a diode D1 to an output filter capacitor Cout, and the duration of one switching cycle $t_s=1/f_s$. The duration of one switching cycle $t_s$ is generally known by the PWM controller 210 because the PWM controller 210 initiates the beginning of each switching cycle.

The average output current is calculated employing equation (1):

$$I_{out}=I_p \cdot (t_{sec}/t_s) \cdot (Np/Ns) \cdot \eta/2 \quad (1)$$

where Ip=primary peak current, $I_{out}$=average output current that is desired to be controlled, Np=number of primary turns of the primary winding of the transformer T1, Ns=number of secondary turns of the secondary winding of the transformer T1, and η=power conversion efficiency.

The primary and secondary turns Np, Ns are generally constant, and efficiency η is effectively constant over a range of output currents $I_{out}$ and is generally known from modeling and prototype models of the power converter. Thus, the primary peak current Ip for a constant output current $I_{out}$ can be represented by equation (2):

$$Ip=(t_s/t_{sec}) \cdot k \quad (2)$$

where the parameter k is a constant representative of the particular power converter design. Thus, if the primary peak current Ip is controlled to be proportional to $t_s/t_{sec}$, the output current $I_{out}$ of the power converter will be constant. For an explanation of the other components of the power converter, see the description of the power converter illustrated with respect to FIG. 1.

Figure 3:
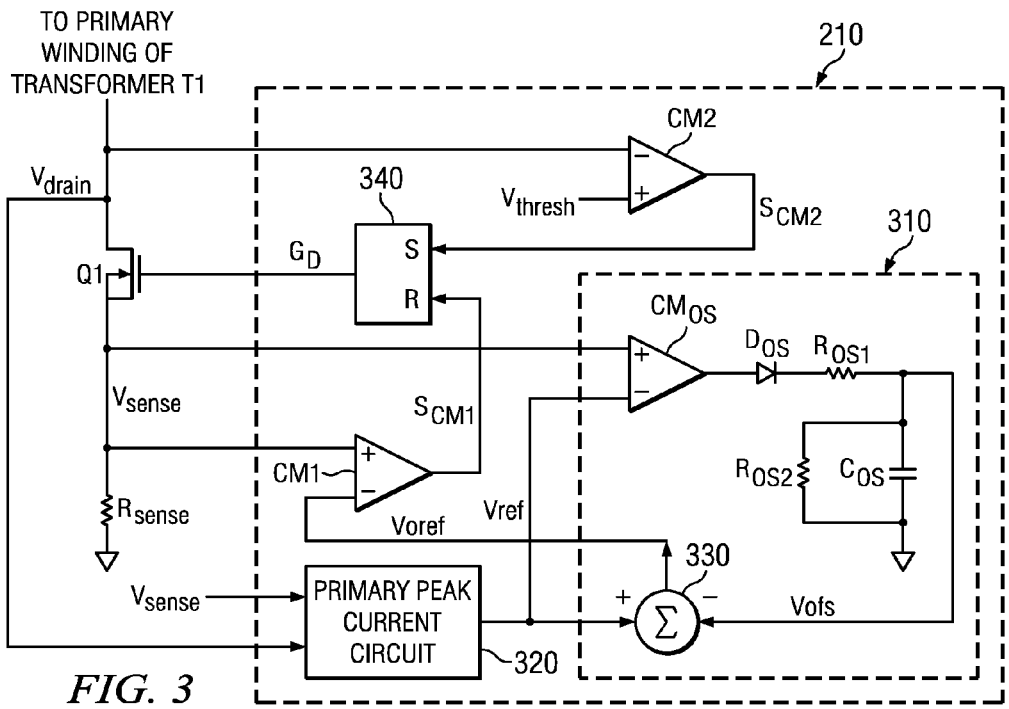
FIGS. 3 and 4 illustrate schematic diagrams of portions of the power converter of FIG. 2, introducing embodiments of a controller constructed according to the principles of the present invention.

Turning now to FIG. 3, illustrated is a schematic diagram of portions of the power converter of FIG. 2, introducing an embodiment of a controller (e.g., the PWM controller) 210 constructed according to the principles of the present invention. The controller 210 includes first and second comparators CM1, CM2, an offset corrector 310, a primary peak current circuit 320, a summer 330 and a set-reset ("S-R") flip-flop 340. To initiate conduction of the power switch Q1, the S-R flip-flop 340 turns on the power switch Q1 (via a gate-drive signal $G_D$) in response to a signal $S_{CM2}$ from the second comparator CM2 detecting a drain voltage $V_{drain}$ of the power switch Q1 falling below a threshold voltage $V_{thresh}$, which occurs upon termination of current flow in the secondary winding of the transformer T1 of the power converter. Termination of current flow in the secondary winding of the transformer T1 is described further hereinbelow with reference to FIG. 5.

To terminate conduction of the power switch Q1, thereby setting the primary peak current Ip through the primary winding of the transformer T1 to the correct value to produce the desired output current $I_{out}$, the first comparator CM1 compares a sense voltage $V_{sense}$ at a sense resistor $R_{sense}$ in series with the power switch Q1 with an offset reference voltage Voref produced by a primary peak current circuit 320 and corrected by an offset corrector 310. The sense voltage $V_{sense}$ at the sense resistor $R_{sense}$ is proportional to the primary peak current Ip that flows through the primary winding of the transformer T1. The output of the first comparator CM1 is coupled to a reset input of the S-R flip-flop 340. When the sense voltage $V_{sense}$ at the sense resistor $R_{sense}$ exceeds the offset reference voltage Voref, the power switch Q1 is turned off by the action of a signal $S_{CM1}$ from the first comparator CM1 to the S-R flip-flop 340 and a gate-drive signal $G_D$ from the S-R flip-flop 340 to the power switch Q1.

Two reference voltages are calculated according to equations (3) and (4):

$$Vref=(I_{out}/\eta)(t_s/t_{sec})R_{sense}*2 \quad (3)$$

$$Voref=Vref-Vofs \quad (4)$$

wherein $I_{out}$ corresponds to a desired output current of the power converter, η is the assumed power conversion efficiency, and Vofs is an offset voltage that compensates the generally unknown power converter delays. The primary peak current circuit 320 provides computation of the reference voltage Vref according to equation (3). The summer 330 provides subtraction according to equation (4). It should be understood that analog and/or digital circuits may perform the computation described by equation (3) in accordance with the primary peak current circuit 320. For example, an integrated circuit designated AD534 produced by Analog Devices, Inc. and described in data sheet entitled "Internally Trimmed Precision IC Multiplier," 1999, which is incorporated herein by reference, can be employed to perform the calculation of equation (3).

The offset corrector 310 provides a mechanism to compensate for the uncertain delays in the power converter elements such as the first comparator CM1 and the turn-on time of the power switch Q1. The offset corrector 310 computes the value of the offset voltage Vofs to provide this compensation. When the sense voltage $V_{sense}$ exceeds the reference voltage Vref, then the output of an offset comparator $CM_{OS}$ provides a current to an offset capacitor $C_{OS}$ through an offset diode $D_{OS}$ and a first offset resistor $R_{OS1}$, thereby incrementing the voltage across terminals of the offset capacitor $C_{OS}$. The voltage across the terminals of the offset capacitor $C_{OS}$ is continually decreased by a second offset resistor $R_{OS2}$. As a result, if the sense voltage $V_{sense}$ (e.g., maximum sense voltage $V_{sense}$) at the sense resistor $R_{sense}$ exceeds the reference voltage Vref during a switching cycle, then the offset voltage Vofs is increased. If the sense voltage $V_{sense}$ (e.g., maximum sense voltage $V_{sense}$) at the sense resistor $R_{sense}$ does not exceed the reference voltage Vref during a switching cycle, the offset voltage Vofs is slowly decreased. Thus, the offset voltage Vofs is a function of the reference voltage Vref and the sense voltage $V_{sense}$. In this manner, the output of the offset corrector 310 is continually adjusted so that the peak value of the sense voltage $V_{sense}$ slightly exceeds the reference voltage Vref computed in the primary peak current circuit 320. The offset corrector 310 thereby compensates for uncertain delays in the power converter.

Figure 4:
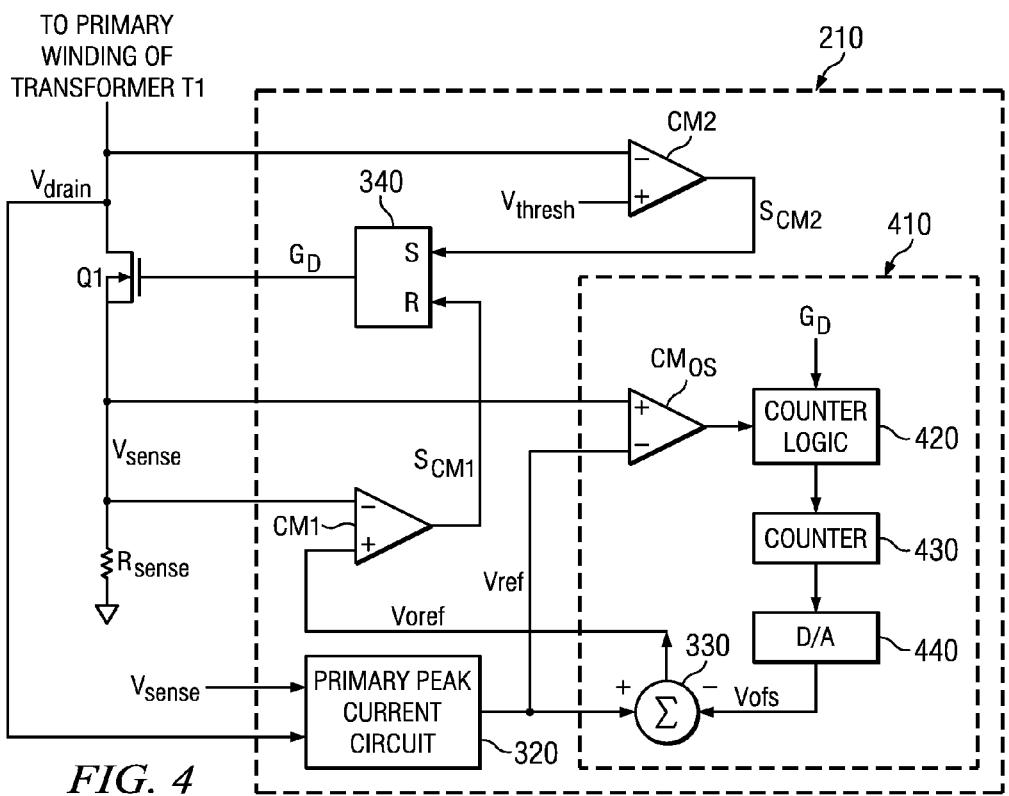

Turning now to FIG. 4, illustrated is a schematic diagram of portions of the power converter of FIG. 2, introducing an embodiment of a controller (e.g., the PWM controller) 210 constructed according to the principles of the present invention. In this embodiment, the offset voltage Vofs is detected with a peak-sensing circuit that employs a counter 430 to provide compensation and adjustment of a sense voltage $V_{sense}$ (e.g., maximum sense voltage $V_{sense}$) at the sense resistor $R_{sense}$ during each switching cycle. If an offset comparator $CM_{OS}$ detects the sense voltage $V_{sense}$ exceeds a reference voltage Vref during a switching cycle, then a counter logic 420 increments the counter 430. If the sense voltage $V_{sense}$ does not exceed the reference voltage Vref during a switching cycle, then the counter logic 420 decrements the counter 430. A digital-to-analog ("D/A") converter 440 converts the stored value in the counter 430 to an analog offset voltage Vofs, which is then coupled to a summer 330. As a result, the offset corrector 410 compensates for uncertain circuit delays. For an explanation of the other components of the controller, see the description of the controller illustrated with respect to FIG. 3.

Figure 5:
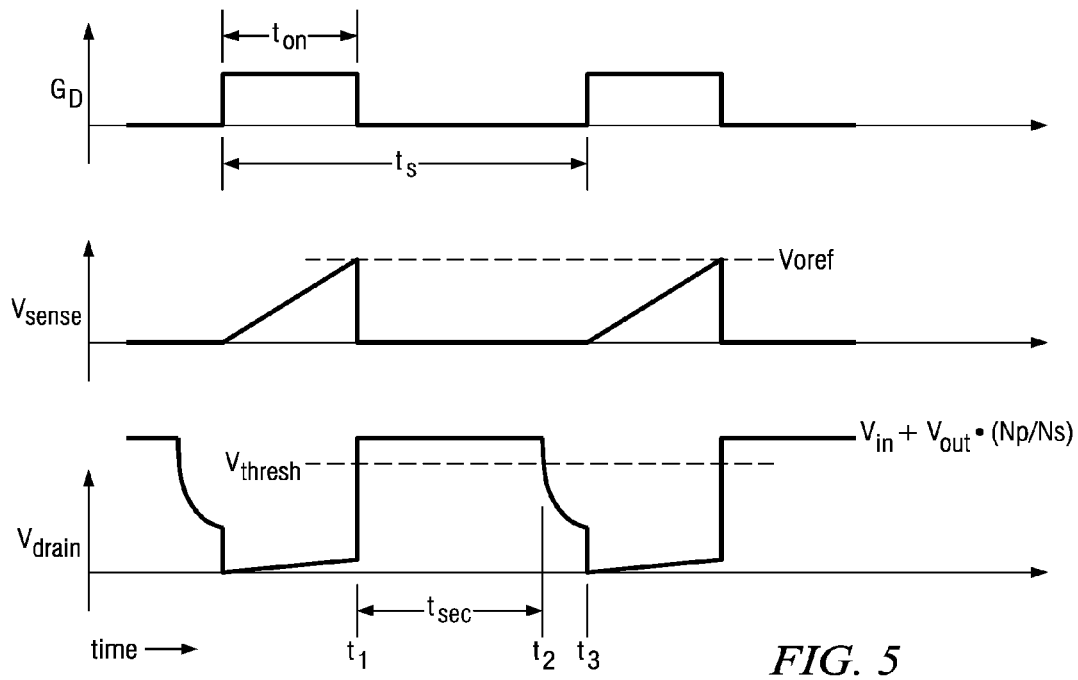
FIG. 5 illustrates a graphical representation of selected waveforms demonstrating an exemplary operation of a power converter according to the principles of the present invention.

Turning now to FIG. 5, illustrated is a graphical representation of selected waveforms demonstrating an exemplary operation of a power converter (e.g., the quasi-resonant flyback power converter of FIG. 2) according to the principles of the present invention. A waveform of a gate-drive signal $G_D$ provides an on time $t_{on}$ for a power switch Q1 with a switching period $t_s$. FIG. 5 also illustrates waveforms of a sense voltage $V_{sense}$ of a sense resistor $R_{sense}$ and a drain voltage $V_{drain}$ of the power switch Q1. When the sense voltage $V_{sense}$ exceeds an offset reference voltage Voref, the on time $t_{on}$ of the power switch Q1 is terminated. When the power switch Q1 is turned off at the time $t_1$ and current is delivered to an output filter capacitor Cout through a diode D1 due to energy stored in the magnetizing inductance of a transformer T1, the drain voltage rises to a level:

$$V_{in}+V_{out} \cdot (Np/Ns).$$

When the energy stored in the magnetizing inductance of transformer T1 is exhausted, the drain voltage $V_{drain}$, falls below a threshold voltage $V_{thresh}$ at time $t_2$, and reaches a value such as a minimum value at time $t_3$. At the time $t_3$, the controller initiates a new switching cycle. The time interval beginning at the time $t_1$ and terminating at the time $t_2$ defines the time interval $t_{sec}$ during which current flows through the diode D1 to an output of the power converter via the output filter capacitor Cout.

Figure 6:
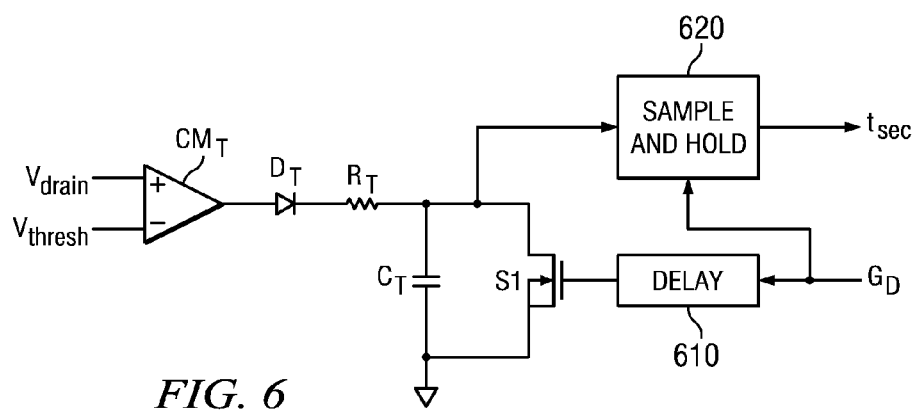
FIGS. 6 to 8 illustrate diagrams of embodiments of portions of a primary peak current circuit employable with a power converter constructed according to the principles of the present invention.
Figure 7:
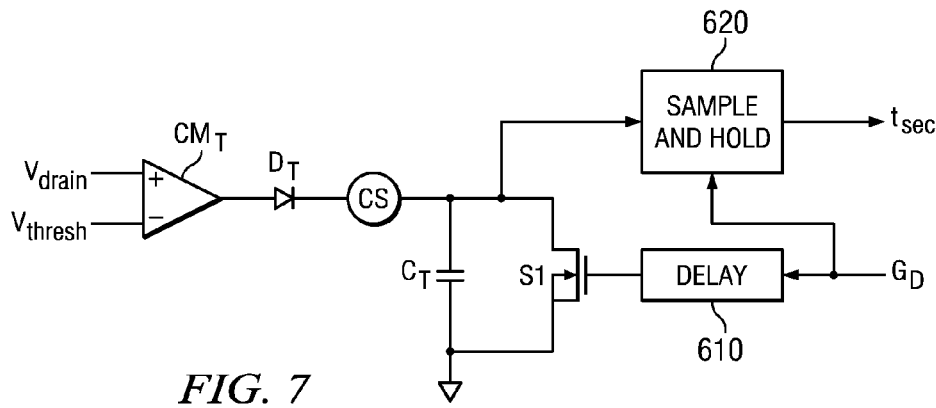

Turning now to FIGS. 6 and 7, illustrated are schematic diagrams of embodiments of a portion of a primary peak current circuit (see, e.g., FIGS. 3 and 4) employable with a power converter (e.g., the quasi-resonant flyback power converter of FIG. 2) constructed according to the principles of the present invention. Beginning with FIG. 6, a timing circuit may be incorporated into the primary peak current circuit and estimates a time interval $t_{sec}$ during which an output current $I_{out}$ is delivered to an output of the power converter via an output filter capacitor Cout due to energy stored in the magnetizing inductance of a transformer T1. A timing comparator $CM_T$ compares a drain voltage $V_{drain}$, with a threshold voltage $V_{thresh}$ as described above with respect to FIG. 5. When the drain voltage $V_{drain}$ exceeds the threshold voltage $V_{thresh}$, the timing comparator $CM_T$ provides current to a timing capacitor $C_T$ through a timing diode $D_T$ and a timing resistor $R_T$. Accordingly, the voltage across the timing capacitor $C_T$ increases at a rate that may be represented by the equation:

$$dV/dt=i_{RT}/C_T,$$

wherein, dV/dt is the rate at which the voltage across the timing capacitor $C_T$ increases, $i_{RT}$ is the current through the timing diode $D_T$ and the timing resistor $R_T$, which can be estimated from the output voltage of the timing comparator $CM_T$ minus the voltage across the timing capacitor $C_T$ and minus the forward voltage drop of the timing diode $D_T$, and $C_T$ in the equation above represents the capacitance of the timing capacitor $C_T$.

Thus, the timing capacitor $C_T$ performs an integration of the current that flows thereto. Preferably, the R·C time constant of the timing resistor $R_T$ and the timing capacitor $C_T$ is long enough to obtain reasonably accurate integration of the current flowing into the timing capacitor $C_T$. A sample-and-hold circuit 620 acquires a voltage such as the maximum voltage across the timing capacitor $C_T$, which is proportional to the time interval $t_{sec}$. The sample-and-hold circuit 620 accordingly produces an estimate of the time interval $t_{sec}$. A control switch S1, illustrated in FIG. 6 as a MOSFET, is coupled to a gate-drive signal GD and periodically discharges the timing capacitor $C_T$ to enable the integration performed in the timing capacitor $C_T$ to start over (i.e., the control switch S1 resets the integration operation). A delay circuit 610 enables the sample-and-hold circuit 620 to acquire the voltage such as the maximum voltage across the timing capacitor $C_T$ before the timing capacitor $C_T$ is discharged by the control switch S1.

Additionally, and as illustrated in the timing circuit of FIG. 7, a constant current source CS may be employed in lieu of the timing resistor $R_T$ to augment an accuracy of current control and a similar circuit as described herein may be employed to estimate a switching cycle $t_s$ of a power switch Q1 of a power converter employing the primary peak current circuit (see, e.g., FIGS. 2 to 4). Assuming a timing circuit with a current source CS as described herein is employed to estimate the time interval $t_{sec}$ and the switching cycle $t_s$, the values of the current source CS and the timing capacitor $C_T$ should substantially match for purposes of low tolerance. While the absolute values of the time constants for both timing circuits (i.e., one timing circuit to estimate the time interval $t_{sec}$ and another timing circuit to estimate the switching cycle $t_s$) may differ, the ratio of the time constants should be substantially constant. As a result, the timing circuits and primary peak current circuit may be embodied in an integrated circuit (e.g., an application specific integrated circuit) because matching components in such integrated circuits is quite achievable while still maintaining high absolute tolerances.

Figure 8:
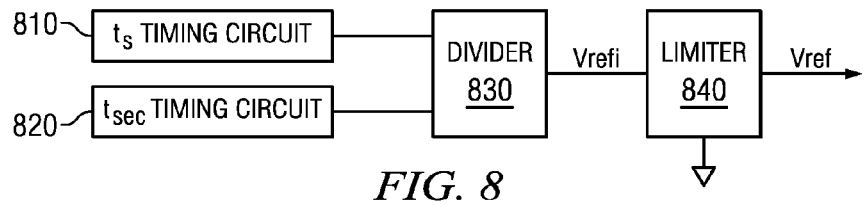

Turning now to FIG. 8, illustrated is a block diagram of an embodiment of a portion of a primary peak current circuit (see, e.g., FIGS. 3 and 4) employable with a power converter (e.g., the quasi-resonant flyback power converter of FIG. 2) configured to provide a reference voltage Vref in accordance with a switching cycle $t_s$ of a power switch Q1 of the power converter and a time interval $t_{sec}$ during which an output current $I_{out}$ is delivered to an output of the power converter. The primary peak current circuit to provide the reference voltage Vref includes a switching cycle timing circuit 810 and a time interval timing circuit 820 analogous to the timing circuit illustrated and described with respect to FIGS. 6 and 7. The primary peak current circuit to provide the reference voltage Vref also includes a divider 830 and a limiter 840. The divider 830 multiples a constant "k" with a ratio of $t_s/t_{sec}$ to provide an initial reference voltage Vrefi, wherein the constant "k" is expressed as a voltage as illustrated in equation (3) above. The limiter 840 thereafter limits a value of the initial reference voltage Vrefi to a predefined range to provide the reference voltage Vref. As a result, the reference voltage Vref is limited to prevent too high of a primary peak current during, for instance, a start up of the power converter when the values of the switching cycle $t_s$ and the time interval $t_{sec}$ are not available.

Thus, a controller for a power converter (e.g., a quasi-resonant flyback power converter) has been introduced that controls a power switch thereof. In one embodiment, the controller includes a primary peak current circuit configured to produce a reference voltage corresponding to a primary peak current through a primary winding of a transformer of a power converter, and an offset corrector configured to provide an offset voltage to compensate for delays in the power converter. The offset voltage may be a function of the reference voltage from the primary peak current circuit and a sense voltage from a sense resistor in series with the power switch. The offset corrector may include an offset comparator, an offset capacitor, an offset diode and an offset resistor or, alternatively, an offset comparator, a counter, counter logic and a digital-to-analog converter.

The controller also includes a summer configured to provide an offset reference voltage as a function of the reference voltage and the offset voltage, and a comparator configured to produce a signal to turn off the power switch coupled to the primary winding of the transformer as a function of the offset reference voltage. The comparator is configured to produce the signal to turn off the power switch when a sense voltage from a sense resistor in series with the power switch exceeds the offset reference voltage. The controller further includes a set-reset flip-flop configured to provide a gate drive signal to the power switch responsive to the signal from the comparator. The set-reset flip-flop is also configured to turn on the power switch responsive to a signal from another comparator detecting a drain voltage of the power switch falling below a threshold voltage.

In a related, but alternative embodiment, a primary peak current circuit of the controller includes a timing circuit configured to estimate a time interval when an output current is delivered to an output of the power converter. The primary peak current circuit also includes a divider configured to multiply a constant with a ratio of a switching frequency of the power switch and the time interval to provide an initial reference voltage. The constant may include a desired output current of the power converter divided by a power conversion efficiency of the power converter. The primary peak current circuit still further includes a limiter configured to limit a value of the initial reference voltage to a predefined range to provide a reference voltage corresponding to a primary peak current through the primary winding of the transformer of the power converter.

The timing circuit of the primary peak current circuit includes a comparator configured to provide a current to a timing capacitor when a drain voltage of the power switch exceeds a threshold voltage, wherein the timing capacitor is configured to perform an integration of the current. The primary peak current circuit also includes a sample-and-hold circuit configured to acquire a voltage across the timing capacitor that is proportional to and produces the estimate of the time interval, and a control switch configured to discharge the timing capacitor to enable the integration to start over as a function of a gate drive signal to the power switch. The primary peak current circuit still further includes a delay circuit configured to enable the sample-and-hold circuit to acquire the voltage across the timing capacitor before the timing capacitor is discharged by the control switch. The comparator is configured to provide the current to the timing capacitor through a timing resistor or a current source when the drain voltage of the power switch exceeds the threshold voltage. Additionally, the primary peak current circuit may include a timing circuit configured to estimate the switching frequency of the power switch.

Figure 9:
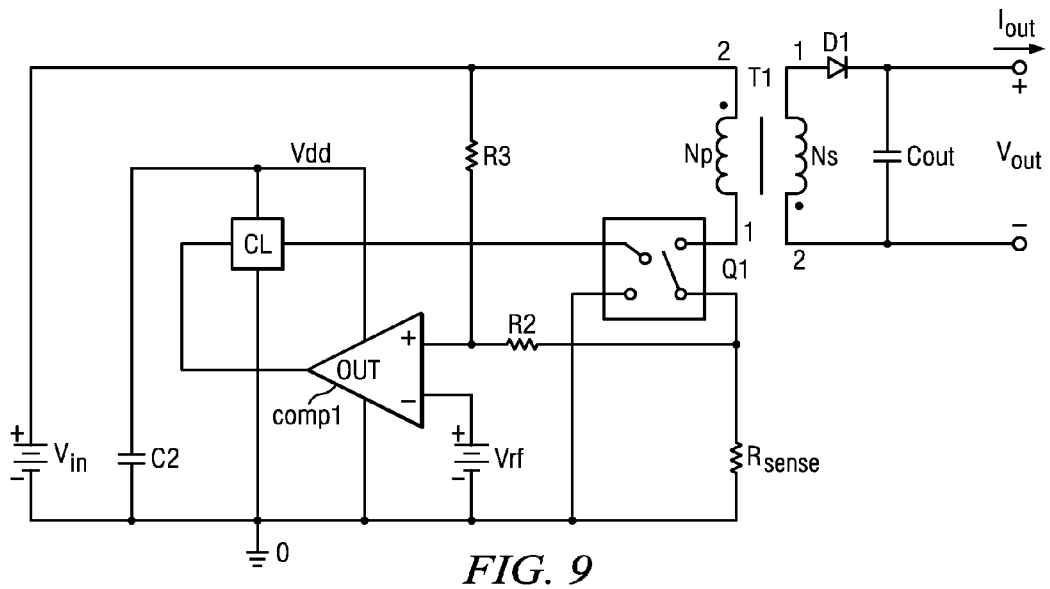
FIG. 9 illustrates a schematic diagram of an embodiment of portions of a power converter that provides an environment for application of the principles of the present invention.

Turning now to FIG. 9, illustrated is a schematic diagram of an embodiment of portions of a power converter (an exemplary flyback power converter) that provides an environment for application of the principles of the present invention. A power train of the power converter includes a power switch Q1 coupled to a source of electrical power such as a dc input power source that provides an input voltage $V_{in}$, represented in FIG. 9 by a battery. The dc input power source supplies input power to an isolating transformer or transformer T1. The transformer T1 is formed with a primary winding with primary turns Np and a secondary winding with secondary turns Ns that are selected to provide an output voltage $V_{out}$ and an output current $I_{out}$ with consideration of a resulting duty cycle and stress on power train components. The power switch Q1 (which may be formed as an n-channel MOSFET) is controlled by a controller (e.g., a PWM controller) formed with a comparator comp1 coupled to control logic CL that periodically controls the power switch Q1 to conduct for a duty cycle D with a frequency $f_s$ to regulate, for example, the output voltage $V_{out}$. The control logic CL and other circuit elements are powered from a bias voltage source Vdd coupled to a bypass capacitor C2.

To limit a primary peak current in the primary winding of the transformer T1, a non-inverting input of comparator comp1 is coupled to a sense resistor $R_{sense}$ in series with the power switch Q1 that produces a ramp voltage proportional to a current of the power switch Q1. The power switch Q1 is typically (but not necessarily) turned on by the control logic CL in response to a clock pulse. When a ramp voltage produced across the sense resistor $R_{sense}$ exceeds a reference voltage (e.g., a constant reference voltage) Vrf that is coupled to the inverting input of the comparator comp1, the output voltage of comparator comp1 goes high, and the power switch Q1 is turned off by the control logic CL, which terminates the duty cycle D. In this manner, a current in the transformer T1 is limited to a peak level.

The circuit to limit the primary peak current in the primary winding of the transformer T1 generally operates with a modest, but significant difference between a peak value of a sensed current and the desired peak current due to logic and power switch circuit delays. A conventional technique that is employed to minimize the difference between the peak value of the sensed current such as a primary peak current in the primary winding of the transformer T1 and the desired peak current is to superimpose a variable dc offset voltage on the sensed voltage at the sense resistor $R_{sense}$. The variable dc offset voltage is generally proportional to the input voltage $V_{in}$. This can be done as illustrated in FIG. 9 with a voltage divider formed with a series circuit arrangement of voltage divider resistors R2, R3 coupled to the input voltage $V_{in}$ of the power converter. The variable dc offset voltage produced by the voltage divider is functionally added to the reference voltage Vrf and is coupled to the inverting input of comparator comp1. A higher variable dc offset voltage would generally be produced by a higher input voltage $V_{in}$. Due to the variable dc offset voltage, the comparator comp1 sends a signal to the control logic CL to control a variable time before the sensed voltage at the sense resistor $R_{sense}$ is higher than the reference voltage Vrf. The variable dc offset voltage is employed to turn off the power switch Q1 at a slightly earlier, but variable time. The variable dc offset voltage produced by the voltage divider compensates the effect of a more rapid rise of current in the power switch Q1 and/or a magnetic circuit element (e.g., the transformer T1) for a higher input voltage $V_{in}$ to the power converter.

Another technique to minimize the difference between the peak of a sensed current and the desired current limit is described by Ralf Schroeder, in German patent application Publication Number DE 100 18 229, Application Number DE20001018229200000412, filed Apr. 12, 2000, which is incorporated herein by reference. In this technique, a sensed voltage at a sense resistor (e.g., the sense resistor $R_{sense}$ illustrated in FIG. 9) is compared with a time-dependent reference voltage. The time-dependent reference voltage is low when the power switch such as the power switch Q1 illustrated in FIG. 9 is switched on and rises during the on time of the power switch. As a result, the voltage such as the sensed voltage produced across the sense resistor $R_{sense}$ illustrated in FIG. 9 exceeds the reference voltage Vrf earlier if the input voltage $V_{in}$ to the power converter is high because the slope of the current is steeper. If the slope of the reference voltage Vrf is adjusted to compensate the variable slope of the sensed current and the respective delays in down-stream circuit elements that control the power switch, the primary peak current of the primary winding of the transformer T1 can be controlled to be less dependent on the input voltage $V_{in}$.

Both of the techniques described above are dependent on delays in down-stream circuit elements and the slope of the sensed current. If these delays or the inductance of magnetic circuit elements varies due to component tolerances and aging and/or temperature changes, the peak of the current also changes. Although variation of the peak current is reduced, it is not entirely eliminated.

The first of the two techniques described above employs the two voltage-divider resistors R2, R3, one of which (resistor R3) is coupled to the input voltage $V_{in}$ to the power converter. If the input voltage $V_{in}$ is a high voltage relative to semiconductor processes employed to produce an integrated circuit in control logic, the voltage-divider resistors R2, R3 are not included within the integrated circuit unless the integrated circuit is formed with high-voltage capability. As a result, the voltage-divider resistors R2, R3 are formed as discreet resistors external to the integrated circuit, which increases size and cost of the power converter. The voltage-divider resistors R2, R3 also produce a power loss that is independent of load power, which increases the no-load input power to the power converter.

An alternative version of the first technique uses a lower voltage that is produced at a winding of the magnetic circuit element (e.g., the transformer) to generate the variable dc offset voltage. In this case, a high-voltage resistor is not needed, and the increase of the no-load input power is significantly reduced. This alternative version, however, is more expensive due to the additional winding that is required in the transformer.

Figure 10:
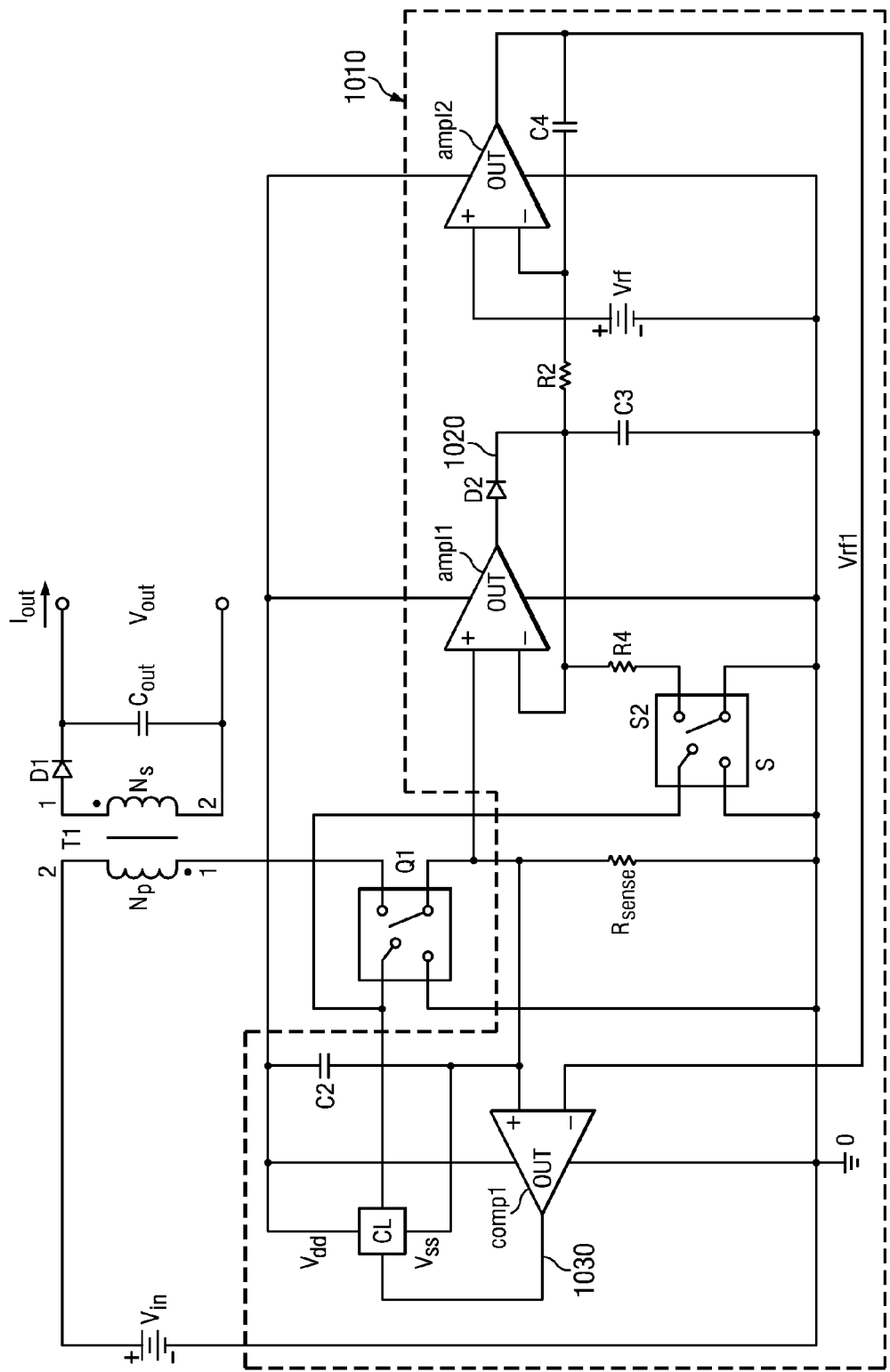
FIG. 10 illustrates a schematic diagram of an embodiment of portions of a power converter including a controller constructed according to the principles of the present invention.

Turning now to FIG. 10, illustrated is a schematic diagram of an embodiment of portions of a power converter (an exemplary flyback power converter) including a controller 1010 constructed according to the principles of the present invention. As introduced herein, the peak value of a sensed voltage produced by a sense resistor $R_{sense}$ or other current-sensing circuit element such as a current-sense transformer in a controller 1010 is measured and stored by a peak detector. The peak detector is formed with a current sensor (sense resistor $R_{sense}$ or other current-sensing circuit element), amplifier ampl1, diode D2, and capacitor C3 to produce a signal 1020 corresponding to a peak current through the sense resistor $R_{sense}$. An adjustable reference circuit in the controller 1010 formed with an inverting amplifier ampl2 responds to a difference between the signal 1020 produced by the peak detector and a reference signal (e.g., a constant reference voltage Vrf) to produce a corrected signal (a corrected reference voltage Vrf1).

The inverting amplifier ampl2 illustrated in FIG. 10 is formed with a compensation network including a resistor R2 and a feedback circuit element such as integrating feedback capacitor C4. The difference between the reference signal Vrf and the signal 1020 produced by the peak detector is amplified, integrated, and inverted to produce the corrected reference voltage Vrf1 that is coupled to an input of a comparator comp1. The comparator comp1 produces a signal 1030 that is coupled to control logic CL to turn off a power switch Q1 when the signal corresponding to the primary peak current through a component such as the primary winding of the transformer T1 or the power switch Q1 exceeds the corrected reference voltage Vrf1. As a result, the corrected reference voltage Vrf1 is adjusted until the peak value of the sensed voltage produced by the sense resistor $R_{sense}$ is equal to the reference voltage Vrf, thereby substantially removing any error caused by unknown delays in logic or by delays in the power switch Q1. Thus, the offset corrector described previously hereinabove to provide an adjustable offset voltage to compensate for delays in a power converter to limit a primary peak current in a transformer, switch or other circuit element is applicable to many converter topologies.

To enable the signal (e.g., a voltage) 1020 from the peak detector to follow the peak value of the sensed voltage produced by a sense resistor $R_{sense}$ when the corresponding peak current is reduced (e.g., if the input voltage $V_{in}$ becomes lower), the capacitor C3 is at least partly discharged a short time before the peak occurs via a resistor R4 and a switch (a peak detector switch) S2. Whenever the power switch Q1 is switched on, the switch S2 is also switched on and the resistor R4 discharges energy from the capacitor C3. Thus, the peak detector includes the resistor R4 and the switch S2 whose conductivity is switched, without limitation, at a switching frequency of the power converter to provide a discharge path for the capacitor C3. The compensation network formed with the resistor R2 and the capacitor C4 can be adjusted to avoid unwanted oscillations. The compensation network can be constructed with further refinements if the response time of the circuit must be very fast.

Different from the circuit illustrated in FIG. 9, a bias voltage return connection $V_{ss}$ of the control logic CL or at least of the output driver thereof should be connected to the power switch Q1 in a manner so that the gate-drive signal (e.g., current) of the power switch Q1 does not flow through the sense resistor $R_{sense}$ and cause an error in the measurement of the peak current. The sensed voltage at the sense resistor $R_{sense}$ is measured negative with respect to ground of the control logic CL so the gate-drive signal does not go through the sense resistor $R_{sense}$.

To avoid magnetic circuit element (e.g., transformer) saturation, or to limit a peak current through a semiconductor device, the peak current flowing therethrough should not exceed a certain current level dependent on the design of the magnetic circuit element or the semiconductor device. Accordingly, the corrected reference voltage Vrf1 should be limited, for example, to a level that is not higher than the reference signal (e.g., the constant reference voltage Vrf).

Figure 11:
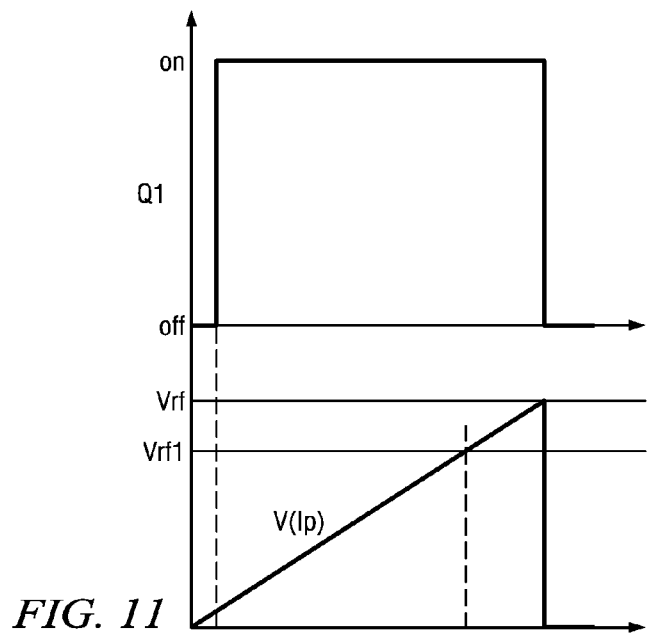
FIG. 11 illustrates waveform diagrams demonstrating an exemplary operation of the power converter of FIG. 10.

Turning now to FIG. 11, illustrated are waveform diagrams demonstrating an exemplary operation of the power converter of FIG. 10. The diagrams represent the conduction period of the power switch Q1 and a sensed voltage V(Ip) through the sense resistor $R_{sense}$ representative of the primary peak current Ip through the transformer T1 or other circuit element (e.g., the power switch Q1). As a result of the operation of the controller 1010, the control logic CL turns off the power switch Q1 when the signal (sensed voltage V(Ip)) corresponding to the primary peak current through a component such as the primary winding of the transformer T1 or the power switch Q1 exceeds the corrected reference voltage Vrf1. Due to circuit delays, the power switch Q1 is ultimately turned off when then the sensed voltage V(Ip) is substantially equal to the reference voltage Vrf. The principles as described herein apply to the controllers as introduced below.

Figure 12:
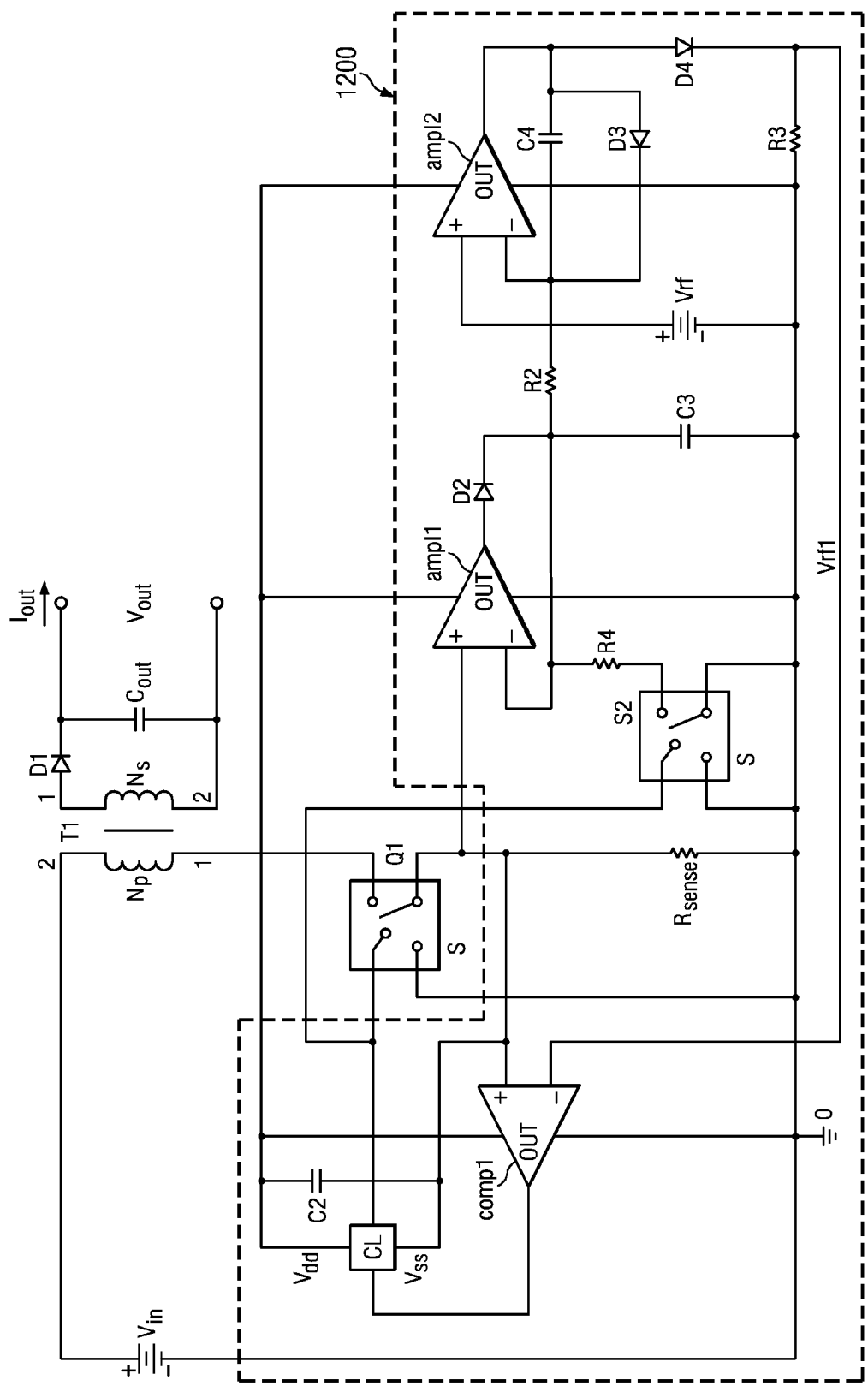
FIGS. 12 to 16 illustrate schematic diagrams of embodiments of portions of power converters including a controller constructed according to the principles of the present invention.

Turning now to FIG. 12, illustrated is a schematic diagram of an embodiment of portions of a power converter (an exemplary flyback power converter) including a controller 1200 constructed according to the principles of the present invention. In the embodiment as illustrated in FIG. 12, the corrected reference voltage Vrf1 produced by the adjustable reference circuit is limited by two limiting diodes D3, D4. The limiting diode D4 is in an output path of the adjustable reference circuit and the limiting diode D3 is in a feedback path of the adjustable reference circuit. The limiting diode D3 couples the output voltage of amplifier ampl2 directly to the negative input of amplifier ampl2 when the output voltage of amplifier ampl2 is higher than the reference voltage Vrf plus the forward voltage of limiting diode D3. With inclusion of the limiting diode D3, the output voltage of amplifier ampl2 cannot get higher than the reference voltage Vrf plus the forward voltage of the limiting diode D3.

With inclusion of limiting diode D4 and resistor R3, the corrected reference voltage Vrf1 equals the output voltage of ampl2 minus the forward voltage of limiting diode D4. If limiting diodes D3, D4 have similar forward voltage drops, the maximum value Vrf1_max of the corrected reference voltage Vrf1 is substantially equal to the reference voltage Vrf, as illustrated below by Equation (5):

$$Vrf1\_max = Vrf + V(D3) - V(D4) \quad (5)$$

If the forward voltage drops V(D3), V(D4) of the limiting diodes D3, D4 are equal, then the maximum value Vrf1_max of the corrected reference voltage Vrf1 will be equal to the reference voltage Vrf. Thus, the corrected reference voltage Vrf1 is limited by the adjustable reference circuit by inclusion of a diode in an output path of the circuit and another diode, preferably a matched diode, in a feedback circuit arrangement. The same matching effect can be achieved with two matching FETs in place of the limiting diodes D3, D4, as illustrated and described later hereinbelow with reference to the controller 1500 of FIG. 15.

The output of the peak detector does not always exactly represent the peak value of the sensed voltage produced across the sense resistor $R_{sense}$ or by another current-sensing circuit element. A capacitor storing the output voltage (e.g., the corrected reference voltage Vrf1) in accordance with the controller as described herein should be slightly discharged before the next peak is measured. This is done with the switch S2 (whose conductivity is substantially synchronized with, or otherwise coordinated with, a switching frequency of power switch Q1) and the resistor R4 as illustrated in FIGS. 10 and 12. By employing this discharging technique, however, the average output voltage in accordance with the controller is slightly lower than the peak value of the sensed voltage. Therefore, the peak value of the sensed voltage will be limited to a slightly higher level than the reference voltage Vrf.

Figure 13:
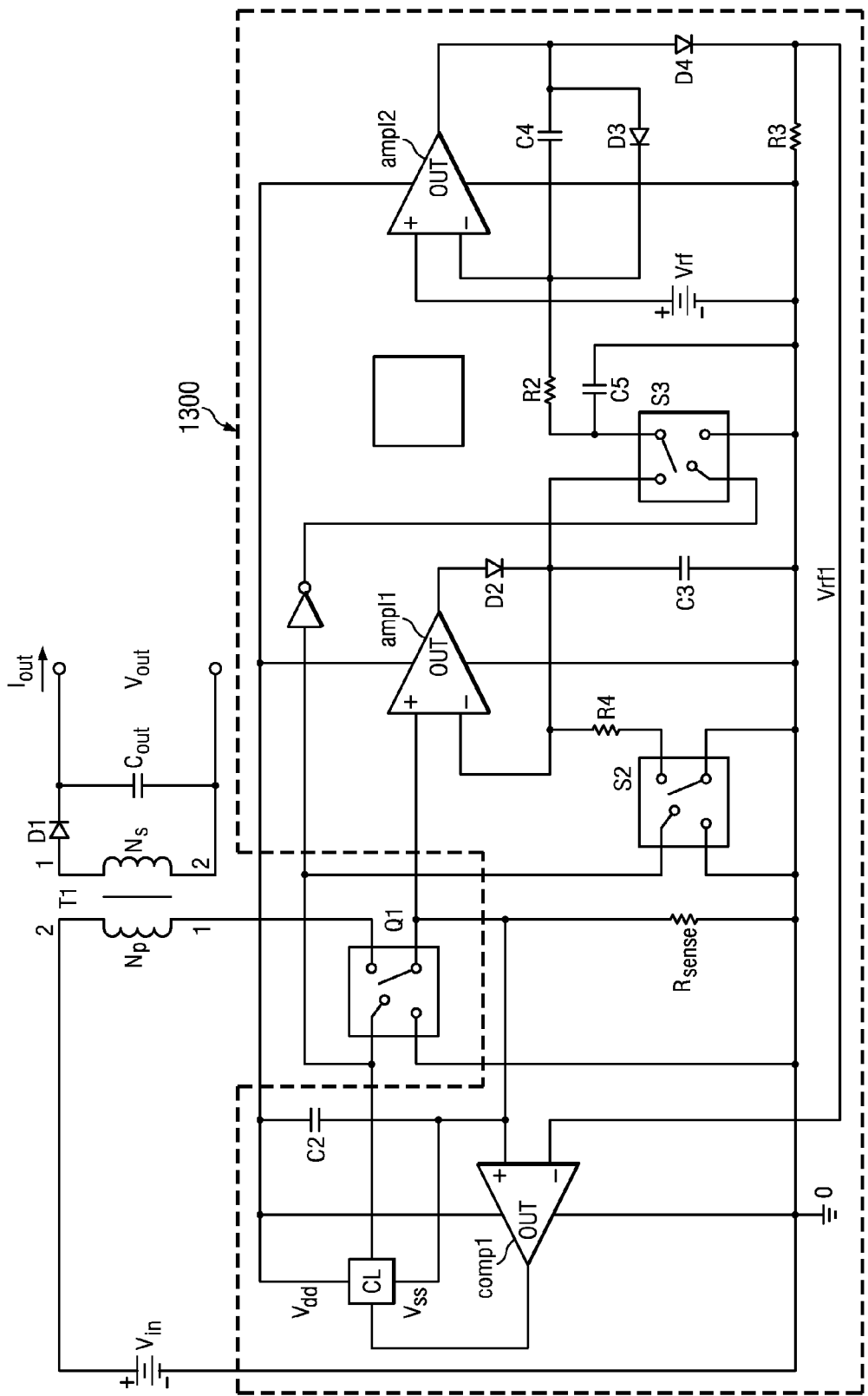

Turning now to FIG. 13, illustrated is a schematic diagram of an embodiment of portions of a power converter (an exemplary flyback power converter) including controller 1300 constructed according to the principles of the present invention. In the embodiment as illustrated in FIG. 13, further reduction of the error of regulating the peak value of the sensed voltage (again, across the sense resistor $R_{sense}$) to the reference voltage Vrf is achieved by including a switch S3 and a capacitor C5 in the circuit. The switch S3 is off when the switch S2 is on. Accordingly, the capacitor C5 is disconnected from the capacitor C3 most of the time when the voltage at the capacitor C3 is lower than the peak value of the sensed voltage. The effect of including the switch S3 is to cause the average voltage at the capacitor C5 to equal more exactly the peak value of the sensed voltage than does the voltage at the capacitor C3. As a result, the difference between the sensed voltage and the reference voltage Vrf is reduced. A further benefit of this circuit is the resistance of the resistor R4 can be reduced without producing a significant effect on the average voltage at the capacitor C5. This enables a faster response time when the peak current is being reduced.

Figure 14:
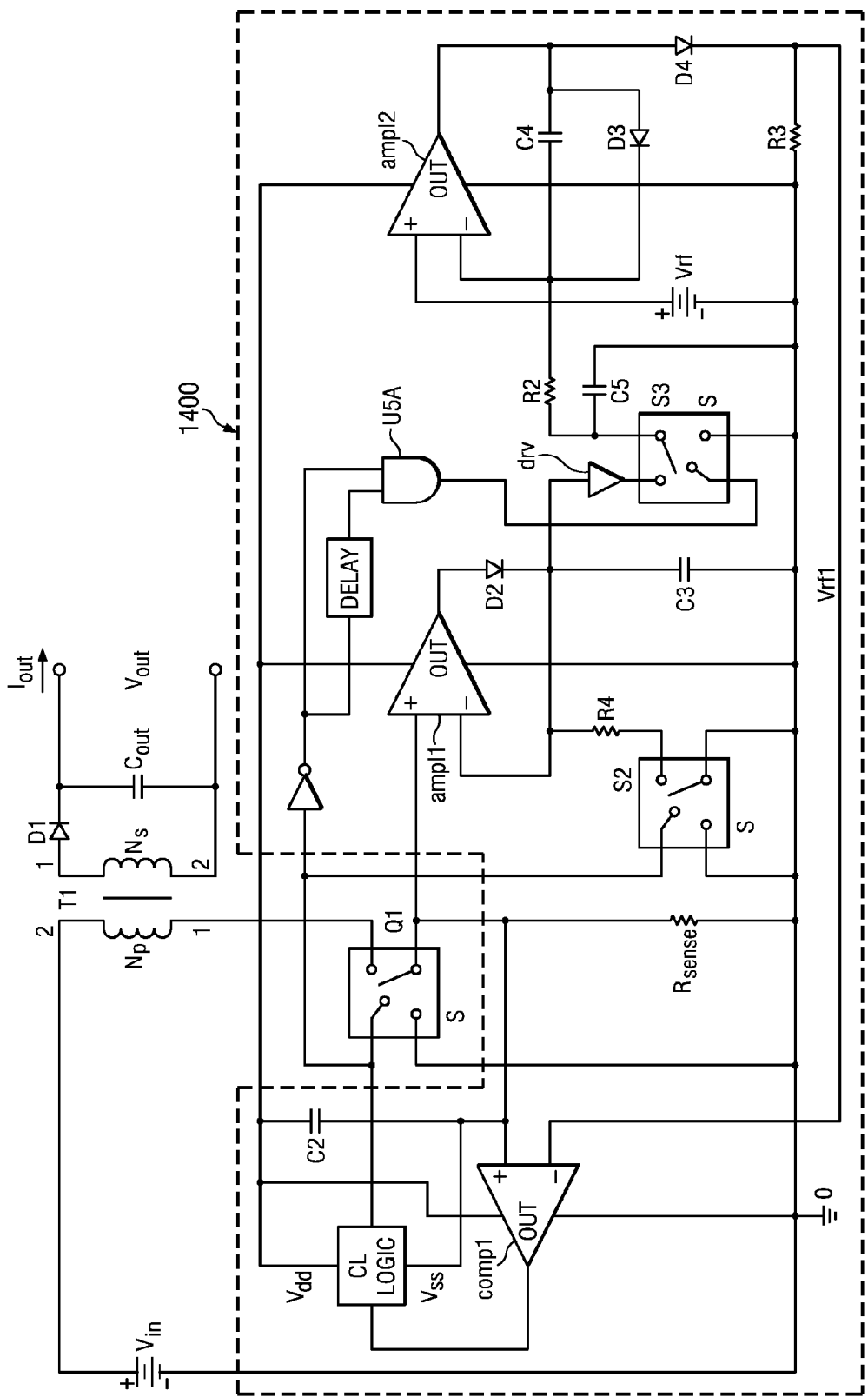

Turning now to FIG. 14, illustrated is a schematic diagram of an embodiment of portions of a power converter (an exemplary flyback power converter) including controller 1400 constructed according to the principles of the present invention. In the embodiment illustrated in FIG. 14, a delay is incorporated in the circuit to further reduce the error between the peak value of the sensed voltage and the reference voltage Vrf. This delay ensures that a capacitor C5 is connected to the capacitor C3 only after the peak of the sensed voltage has occurred. An additional driver dry ensures that the capacitor C3 is not discharged while the capacitor C5 is charged. This ensures that the voltage at the capacitor C5 equals more closely the peak value of the sensed voltage.

Figure 15:
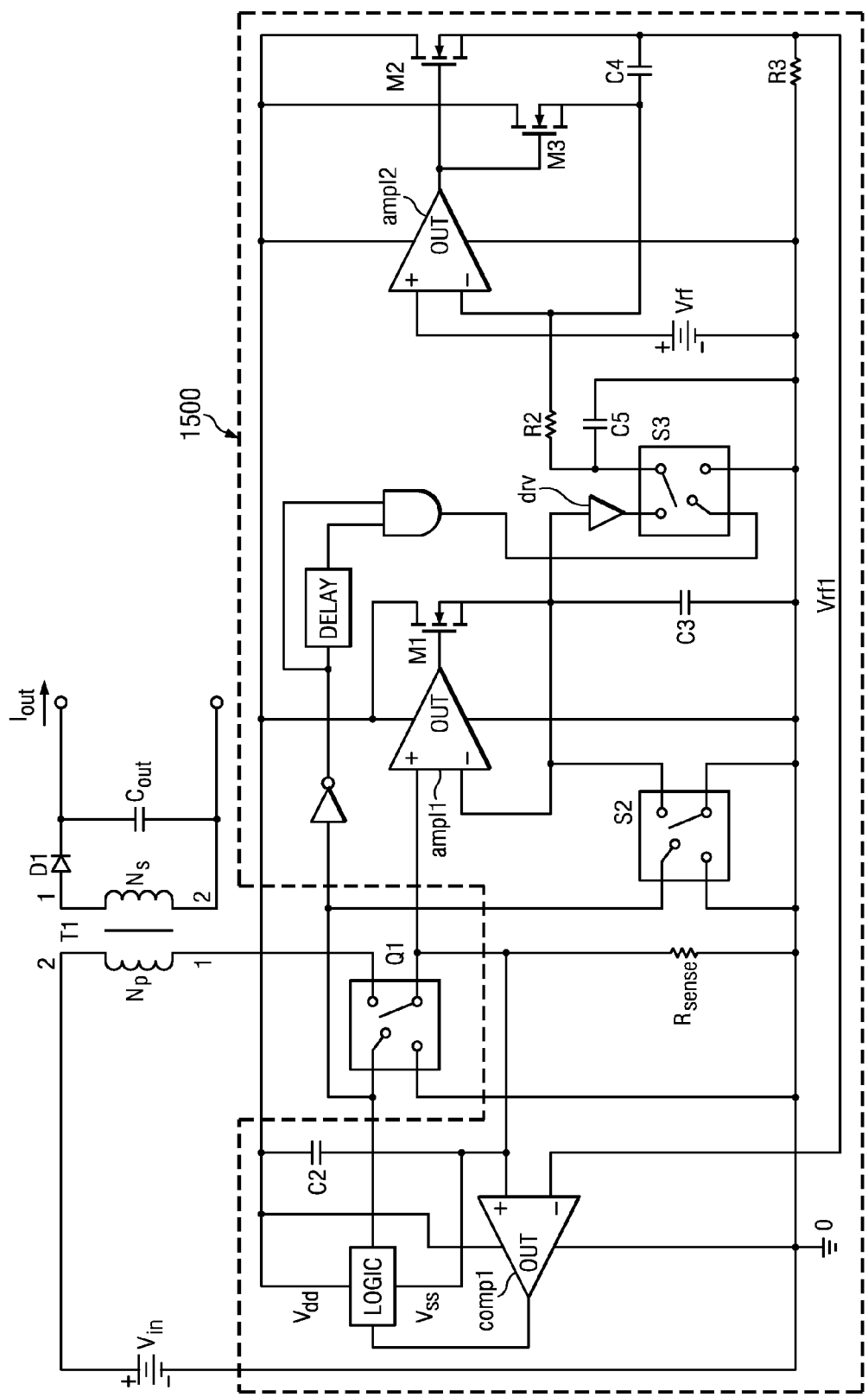

Turning now to FIG. 15, illustrated is a schematic diagram of an embodiment of portions of a power converter (an exemplary flyback power converter) including controller 1500 constructed according to the principles of the present invention. In the embodiment illustrated in FIG. 15, the diodes D2, D3, D4 are replaced by switched (e.g., field-effect transistors) M1, M2, M3. Bipolar transistors could be used in place of these field-effect transistors. The field-effect transistor M2 is in an output path of the adjustable reference circuit and the field-effect transistor M3 is in a feedback path of the adjustable reference circuit. The diode D2 can be omitted if the lower half of the push-pull driver of amplifier ampl1 is removed. Only the upper half of the driver functionally remains in the circuit with inclusion of the field-effect transistor M1. Since the field-effect transistor M1 is a source follower, it cannot pull down its output (source) voltage. Therefore, the diode D2 is no longer necessary.

The limiting diode D3 can be replaced by the field-effect transistor M3 if the transistor M3 matches the transistor M2 and the diode D4 is also removed. The field-effect transistor M2 is the upper half of the push-pull output driver of amplifier ampl2. The resistor R3 replaces the lower half of the push-pull driver to simplify the implementation. The resistor R3 can be replaced by the lower half of the push-pull driver without a negative effect on its operation.

Figure 16:
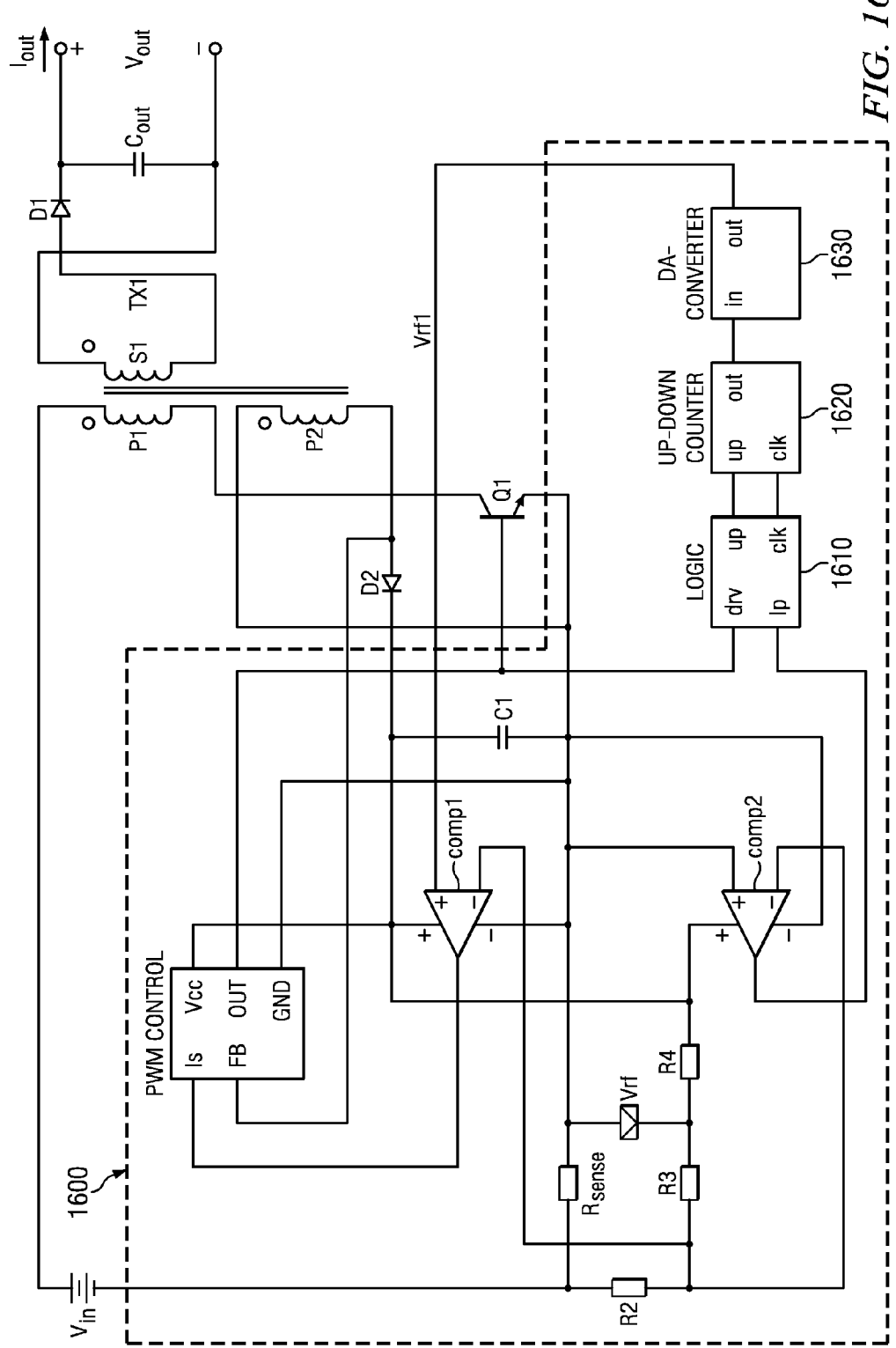

Turning now to FIG. 16, illustrated is a schematic diagram of an embodiment of portions of a power converter (an exemplary flyback power converter) including controller 1600 constructed according to the principles of the present invention. In the embodiment illustrated in FIG. 16, a comparator comp2 is employed to detect if the desired peak current through the power switch Q1 was reached during a switching cycle. If not, the corrected reference voltage Vrf1 of the controller is increased. Otherwise, the corrected reference voltage Vrf1 is decreased by logic 1610 and up-down converter 1620 and analog-to-digital converter 1630 (as part of an adjustable reference circuit). By implementing an appropriate step size and logic, a frequency jitter can be implemented to improve EMI. Up-down converter 1620 may be formed with digital logic such as a microprocessor.

The field-effect transistor previously described to implement power switch Q1 is now replaced with a bipolar switch, but a field-effect transistor can be substituted. Several analog circuit elements illustrated in FIGS. 9 through 16 have been replaced with digital components. In particular, amplifier ampl1 is replaced by comparator comp2, and amplifier ampl2 is replaced by digital up-down counter 1620, logic circuit elements 1610, and digital-to-analog converter 1630. A transformer TX1 coupled to the power switch Q1 includes primary windings P1, P2, and a secondary winding S1.

Whenever the desired peak current level in the switch Q1 is reached during a switching period (as indicated by comparator comp2 output going high), the up-down counter 1620 counts down. If the desired peak current level is not reached, the up-down counter 1620 counts up. The logic circuit elements in the logic block 1610 can determine if the counter 1620 counts one or more digits per switching cycle. In an embodiment, the up-down counter 1620 counts one step per switching cycle (e.g., such a one-step process is slow but precise). In another embodiment, if two or more counts go into the same direction, then the number of counter increments per period is increased. This embodiment produces a faster response, but causes a larger output current ripple and frequency variation. Counting up of the up-down counter 1620 is disabled when all of its bits are high, and counting down of the up-down counter 1620 is disabled when all of its bits are low. The digital output of up-down counter 1620 is converted to the corrected reference voltage Vrf1 by digital-to-analog converter 1630 to produce the corrected reference voltage Vrf1. Preferably, the digital-to-analog conversion is performed with a fixed offset to reduce the required number of bits. The corrected reference voltage Vrf1 is coupled to the non-inverting input of comparator comp1, which generates a signal Is for the PWM control block to switch off power switch Q1 with the proper timing when the desired peak current level in power switch Q1 is reached.

Thus, as introduced herein, a controller is employed with an adjustable reference circuit to produce a corrected reference voltage to enable a current limiter to disable conductivity of a power switch when a voltage corresponding to a peak current through a power switch or other circuit element exceeds the corrected reference voltage. The technique can be advantageously employed to accurately limit a peak current in a circuit element such as a transformer at a desired level independent of variations in power converter input voltage, operating conditions, and/or tolerances and variations of delays and inductances of magnetic circuit elements. The technique can also be employed to reduce an output ripple of a switch-mode power converter. The technique can be employed to provide precise output current control without a secondary-side current monitor. Cost and no-load input power consumption can be reduced because the controller including the current limiter do not require a resistor to be connected to a high voltage such as an input voltage to the power converter.

Those skilled in the art should understand that the previously described embodiments of a controller for a power converter configured to control a power switch and related methods of operating the same are submitted for illustrative purposes only. While a controller has been described in the environment of a power converter, these processes may also be applied to other systems such as, without limitation, a power amplifier or a motor controller, which are broadly included herein in the term "power converter."

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991).

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller employable with a power converter, comprising:
   a peak detector, coupled to a circuit element of said power converter, configured to produce a signal corresponding to a peak current through said circuit element; and
   an adjustable reference circuit responsive to a difference between said signal and a reference signal corresponding to a desired peak current to produce a corrected reference signal corresponding to said peak current.

2. The controller as recited in claim 1 wherein said circuit element is a power switch and said controller further comprises a comparator coupled to said peak detector and said adjustable reference circuit configured to disable conductivity of said power switch when said signal exceeds said corrected reference signal.

3. The controller as recited in claim 1 wherein said peak detector comprises a current sensor, an amplifier, a diode, and a capacitor.

4. The controller as recited in claim 3 wherein said current sensor comprises a resistor.

5. The controller as recited in claim 3 wherein said peak detector further comprises a resistor and a peak detector switch with conductivity switched at a frequency related to a switching frequency of said power converter to provide a discharge path for said capacitor.

6. The controller as recited in claim 1 wherein said adjustable reference circuit comprises an amplifier including a feedback capacitor.

7. The controller as recited in claim 1 wherein said adjustable reference circuit comprises digital logic and a digital-to-analog converter.

8. The controller as recited in claim 7 wherein said digital logic comprises an up-down counter.

9. The controller as recited in claim 1 wherein said corrected reference signal is limited by a first diode in an output path of said adjustable reference circuit and a second diode in a feedback path of said adjustable reference circuit.

10. The controller as recited in claim 1 wherein said corrected reference signal is limited by a first switch in an output path of said adjustable reference circuit and a second switch in a feedback path of said adjustable reference circuit.

11. A method employable with a power converter, comprising:
    producing a signal corresponding to a peak current through a circuit element of said power converter;
    producing a reference signal corresponding to a desired peak current associated with said circuit element; and
    produce a corrected reference signal corresponding to said peak current responsive to a difference between said signal and said reference signal.

12. The method as recited in claim 11 wherein said circuit element is a power switch and further comprising disabling conductivity of said power switch when said signal exceeds said corrected reference signal.

13. The method as recited in claim 11 wherein said corrected reference signal is produced with digital logic and a digital-to-analog converter.

14. The method as recited in claim 11 further comprising limiting said corrected reference signal with a feedback circuit.

15. A power converter, comprising:
 a circuit element coupled to an input of said power converter; and
 a controller, coupled to said circuit element, comprising:
  a peak detector configured to produce a signal corresponding to a peak current through said circuit element, and
  an adjustable reference circuit responsive to a difference between said signal and a reference signal corresponding to a desired peak current to produce a corrected reference signal corresponding to said peak current.

16. The power converter as recited in claim 15 wherein said circuit element is a power switch and said controller further comprises a comparator coupled to said peak detector and said adjustable reference circuit configured to disable conductivity of said power switch when said signal exceeds said corrected reference signal.

17. The power converter as recited in claim 15 wherein said peak detector comprises a current sensor, an amplifier, a diode, and a capacitor.

18. The power converter as recited in claim 15 wherein said adjustable reference circuit comprises an amplifier including a feedback capacitor.

19. The power converter as recited in claim 15 wherein said adjustable reference circuit comprises digital logic and a digital-to-analog converter.

20. The power converter controller as recited in claim 15 wherein said corrected reference signal is limited by a first diode or a first switch in an output path of said adjustable reference circuit and a second diode or a second switch in a feedback path of said adjustable reference circuit.

\* \* \* \* \*